(12) United States Patent
Barta

(10) Patent No.: US 8,117,235 B1
(45) Date of Patent: Feb. 14, 2012

(54) TECHNIQUES FOR BINDING RESOURCES FOR USE BY A CONSUMER TIER

(75) Inventor: David Barta, West Roxbury, MA (US)

(73) Assignee: EMC Corporation, Hopkinton, MA (US)

( * ) Notice: Subject to any disclaimer, the term of this patent is extended or adjusted under 35 U.S.C. 154(b) by 441 days.

(21) Appl. No.: 12/286,226

(22) Filed: Sep. 29, 2008

(51) Int. Cl.
    *G06F 7/00* (2006.01)

(52) U.S. Cl. ........ 707/802; 707/635; 707/692; 707/827; 711/114; 711/153; 711/161

(58) Field of Classification Search ................. 707/635, 707/692, 802, 827; 711/114, 153, 161
See application file for complete search history.

(56) References Cited

U.S. PATENT DOCUMENTS

| | | | |
|---|---|---|---|
| 5,206,939 A | 4/1993 | Yanai et al. | |
| 5,544,347 A | 8/1996 | Yanai et al. | |
| 5,742,792 A | 4/1998 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 6,101,497 A | 8/2000 | Ofek | |
| 6,839,803 B1 * | 1/2005 | Loh et al. | 711/113 |
| 7,047,366 B1 | 5/2006 | Ezra | |
| 7,281,109 B2 * | 10/2007 | Kano | 711/165 |
| 7,434,017 B2 * | 10/2008 | Maruyama et al. | 711/165 |
| 7,693,884 B2 * | 4/2010 | Akelbein et al. | 713/165 |
| 2002/0052941 A1 * | 5/2002 | Patterson | 709/223 |
| 2002/0133669 A1 * | 9/2002 | Devireddy et al. | 711/114 |
| 2005/0055501 A1 * | 3/2005 | Guha et al. | 711/112 |
| 2005/0289308 A1 * | 12/2005 | Kano | 711/161 |
| 2006/0123386 A1 * | 6/2006 | Tameshige et al. | 717/100 |
| 2006/0206507 A1 * | 9/2006 | Dahbour | 707/100 |
| 2007/0010947 A1 * | 1/2007 | Ireland et al. | 702/6 |
| 2007/0055715 A1 * | 3/2007 | Achiwa | 707/204 |
| 2007/0233987 A1 * | 10/2007 | Maruyama et al. | 711/165 |
| 2007/0299959 A1 * | 12/2007 | Penny et al. | 709/223 |
| 2008/0104350 A1 * | 5/2008 | Shimizu et al. | 711/165 |
| 2008/0201542 A1 * | 8/2008 | Maruyama et al. | 711/165 |

OTHER PUBLICATIONS

U.S. Appl. No. 12/215,432, filed Jun. 27, 2008, Chilton, et al.
U.S. Appl. No. 12/214,667, filed Jun. 20, 2008, Blitzer, et al.
U.S. Appl. No. 11/254,089, filed Oct. 19, 2005, Yochai, et al.

* cited by examiner

Primary Examiner — Cheyne Ly
(74) Attorney, Agent, or Firm — Muirhead and Saturnelli, LLC

(57) ABSTRACT

Described are techniques for configuring resources of a data storage system. A definition for each of one or more tiers is provided. Each of the tiers corresponds to a different class of consumer of data storage system resources and has a different corresponding definition including a set of one or more clauses and a priority of each clause in said set relative to other clauses in said set. Each of the clauses in the set is one of a plurality of predefined types of clauses. One or more data storage consumers are associated with each tier. A first set of data storage system resources is associated with a first of said one or more tiers in accordance with a corresponding first definition for said first tier. The first set is used when processing storage provisioning requests and I/O requests for data storage consumers associated with the first tier.

20 Claims, 12 Drawing Sheets

TECHNIQUES FOR BINDING RESOURCES FOR USE BY A CONSUMER TIER

BACKGROUND

1. Technical Field

This application generally relates to data storage, and more particularly to techniques used in connection with data storage system management.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices, or logical volumes (LVs). The logical disk units may or may not correspond to the actual disk drives. Allowing multiple host systems to access the single storage device unit allows the host systems to share data stored therein.

Different tasks may be performed in connection with a data storage system. For example, a customer may perform data storage management and configuration tasks. Such tasks may include, for example, configuring and provisioning storage for use with one or more applications. Data storage requirements for an application may be expressed in terms of one or more objectives, such as performance goals to be achieved for the application. A data storage system administrator may perform data storage system management tasks in accordance with the foregoing objectives, for example, by specifying the logical and/or physical devices used for the storage allocation and provisioning, specifying whether the data should be replicated, the particular RAID (Redundant Array of Independent or Inexpensive Disks) level, and the like. The data storage administrator typically decides how to implement and achieve the foregoing objectives for an application in terms of the physical resources, various RAID configurations, and the like, that may be available in a data storage system for use by the application and with the application data. Using existing tools, in connection with performing data storage management tasks, it may be difficult for a data storage administrator to appropriately configure resources of the data storage system for use by the application in order to achieve the desired objectives for the application.

Thus, it may be desirable to utilize a flexible technique which assists in connection with performing data storage management tasks in accordance with one or more objectives for an application.

SUMMARY OF THE INVENTION

In accordance with one aspect of the invention is a method of configuring resources of a data storage system comprising: providing a definition for each of one or more tiers, each of said one or more tiers corresponding to a different class of consumer of data storage system resources, each of said one or more tiers having a different corresponding definition including a set of one or more clauses and a priority of each clause in said set relative to other clauses in said set, each of said clauses in said set being one of a plurality of predefined types of clauses, said plurality of predefined types of clauses including at least one goal clause specifying an objective for said each tier and including at least one configuration clause specifying a data storage system configuration characteristic dependent on a data storage system resource used in connection with data storage for consumers of said each tier; associating one or more data storage consumers with each of said one or more tiers; and associating a first set of data storage system resources with a first of said one or more tiers in accordance with a corresponding first definition for said first tier, said first set used when processing storage provisioning requests and I/O requests for data storage consumers associated with said first tier. At least one goal clause may include at least one of a performance goal clause specifying an I/O performance goal, an availability goal clause specifying a level of availability, a protection clause specifying a recovery time objective, a protection clause specifying a recovery point objective, a cost clause specifying a data storage cost per unit of storage, and a power clause. At least one configuration clause may include at least one of a utilization clause specifying a level of utilization of a data storage system component, a device type clause indicating a type of data storage device, a RAID type clause indicating a RAID level, and a replication clause indicating a data replication facility used to provide data replication. One of said data storage system consumers may be an application, and said first definition may be used in determining an amount of cache in the data storage system which is included in said first set for use in connection with processing I/O requests for the application. Each of the one or more tiers may have a corresponding definition including a second set of one or more of said plurality of predefined types of clauses specifying expected criteria. The method may include periodically performing first processing for each consumer associated with said each tier, said first processing including: a) determining a relative priority of clauses in said second set; and b) performing second processing for each of at least a portion of clauses in said second set, said second processing including: b1) determining whether observed data associated with storage for said each consumer is in accordance with expected criteria of said each clause; and b2) if said observed data is not in accordance with said expected criteria, determining one or more remediation actions. The step of determining one or more remediation actions may further include performing: determining whether each of said remediation actions adversely impacts other clauses in the second set by violating expected criteria for said other clauses for said each consumer; and selecting a best one of said remediation actions in accordance with selection criteria, said selection criteria including selecting a remediation action which is expected to cause said observed data for said each consumer to be in accordance with said expected criteria of said each clause, does not violate expected criteria of other clauses in said second set for said each consumer having a higher priority than said each clause, and has a minimum adverse impact on expected criteria of other clauses in said second set for said each consumer having a lower priority than said each clause. The at least one goal clause may include criteria specified using an absolute value or a term which represents one or more values. The criteria of the at least one goal clause may include a first term selected from a plurality of terms, each of said plurality of terms being associated with one or more numeric values. The second set of clauses may include a first clause specifying first criterion and a second clause specifying second criterion, and said remediation actions may include a first option which violates the first criterion and does not violate the second criterion, and a second option which violates the second criterion and does not violate the first criterion. If the first clause has a higher priority than said second clause, said selecting one of said remediation actions may select the second option. If the first clause has a lower priority than said second clause, said selecting one of said remediation actions may select the first option. The second set may include a performance goal clause specifying an expected rate of I/O performance, a cost clause specifying a cost objective and a device clause specifying a physical device characteristic. The performance goal clause may have a first priority. The cost clause may have a second priority lower than said first priority. The device clause may have a third priority lower than said second priority. Data said each consumer may be stored on a first device set of one or more devices, and said data storage system may include a second device set of one or more devices and a third device set of one or more devices. The second device set and said third device set may have actual rates of I/O performance better than the expected rate of I/O performance. The second device set may not violate the cost clause and may violate the device clause. The third device set may violate the cost clause and the device clause. The remediation actions to increase the actual rate of I/O performance for said each consumer to meet the expected rate of I/O performance may include: increasing an amount of cache available for use by said each consumer, migrating a portion of data for said each consumer from said first device set to said second device set, and migrating a portion of data for said each consumer from said first device set to said third device set. If it is determined that a portion of data for said each consumer should be migrated rather than increasing an amount of cache, said selecting one of said remediation actions may cause a migration of a portion of data for said each consumer from said first device set to said second device set in accordance with said second set of clauses and associated relative priority of clauses in said second set. The first set of data storage system resources may be selected in accordance with clauses of said first definition and a relative priority of clauses of said first definition. The first set may have actual characteristics in accordance with a prioritized set of expected characteristics and expected objectives. The expected characteristics may be specified in configuration clauses of said first definition to attain said expected objectives specified in goal clauses of said first definition. The expected characteristics and said expected objectives may be prioritized in said prioritized set in accordance with the relative priority of clauses for said first definition. Processing may be automatically performed to adjust data storage system resources in said first set if observed data is not in accordance with said prioritized set for said first definition. At least one goal clause for said first definition may identify an expected objective dependent on one or more dynamic characteristics of the data storage system. For said first tier having said first definition including a second set of one or more of said plurality of predefined types of clauses specifying expected criteria, first processing for each consumer associated with said first tier may be periodically performed. The first processing may include: determining whether said expected criteria for each clause in the second set is met; and if said excepted criteria for each clause in the second set is not met, adjusting said first set of data storage system resources in accordance with said second set and a relative priority of clauses in said second set. The selection criteria may include assessing, based on modeling implementation of a particular remediation action, whether implementation of the particular remediation action adversely impacts at least one of: other clauses for said each consumer, other consumers in said each tier, and another tier of said one or more tiers.

In accordance with another aspect of the invention is a computer readable medium comprising executable code stored thereon for configuring resources of a data storage system, the computer readable medium comprising executable code stored thereon for: providing a definition for each of one or more tiers, each of said one or more tiers corresponding to a different class of consumer of data storage system resources, each of said one or more tiers having a different corresponding definition including a set of one or more clauses and a priority of each clause in said set relative to other clauses in said set, each of said clauses in said set being one of a plurality of predefined types of clauses, said plurality of predefined types of clauses including at least one goal clause specifying an objective for said each tier and including at least one configuration clause specifying a data storage system configuration characteristic dependent on a data storage system resource used in connection with data storage for consumers of said each tier; associating one or more data storage consumers with each of said one or more tiers; and associating a first set of data storage system resources with a first of said one or more tiers in accordance with a corresponding first definition for said first tier, said first set used when processing storage provisioning requests and I/O requests for data storage consumers associated with said first tier. The at least one goal clause may include at least one of a performance goal clause specifying an I/O performance goal, an availability goal clause specifying a level of availability, a protection clause specifying a recovery time objective, a protection clause specifying a recovery point objective, a cost clause specifying a data storage cost per unit of storage, and a power clause. The at least one configuration clause may include at least one of a utilization clause specifying a level of utilization of a data storage system component, a device type clause indicating a type of data storage device, a RAID type clause indicating a RAID level, and a replication clause indicating a data replication facility used to provide data replication.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
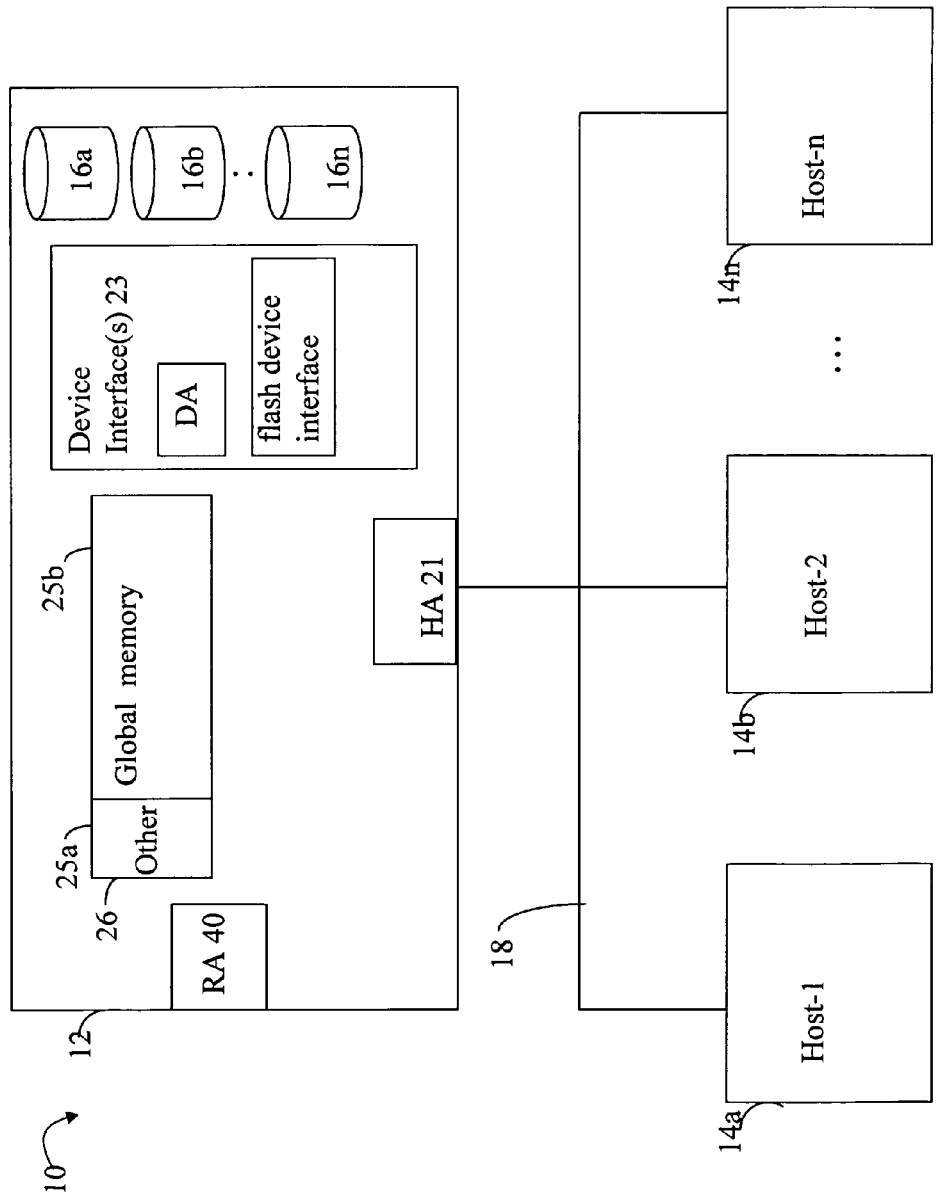
FIG. 1 is an example of an embodiment of a computer system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the computer system 10, and the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel (FC), iSCSI, and the like. Some or all of the connections by which the hosts and data storage system may be connected to the communication medium may pass through other communication devices, such as a Connectrix or other switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts.

The data storage array may also include different types of adapters or directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA) or other adapter which facilitates host communication. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the drives or devices 16a-16n of the storage systems directly, but rather access to data may be provided to one or more host systems from what the host systems view as a plurality of logical devices or logical volumes (LVs). The LVs may or may not correspond to the actual physical devices or drives 16a-16n. For example, one or more LVs may reside on a single physical drive or multiple drives. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LV(s) residing thereon. A flash device interface may be another type of device interface used in connection with facilitating data transfers to/from the associated flash devices and LV(s) residing thereon. It should be noted that an embodiment may use the same or a different device interface for one or more different types of devices than as described herein.

The device interface, such as a DA, performs I/O operations on a drive 16a-16n. In the following description, data residing on an LV may be accessed by the device interface following a data request in connection with I/O operations that other directors originate. Data may be accessed by LV in which a single device interface manages data requests in connection with the different one or more LVs that may reside on a drive 16a-16n. For example, a device interface may be a DA that accomplishes the foregoing by creating job records for the different LVs associated with a particular device. These different job records may be associated with the different LVs in a data structure stored and managed by each device interface.

Figure 2:
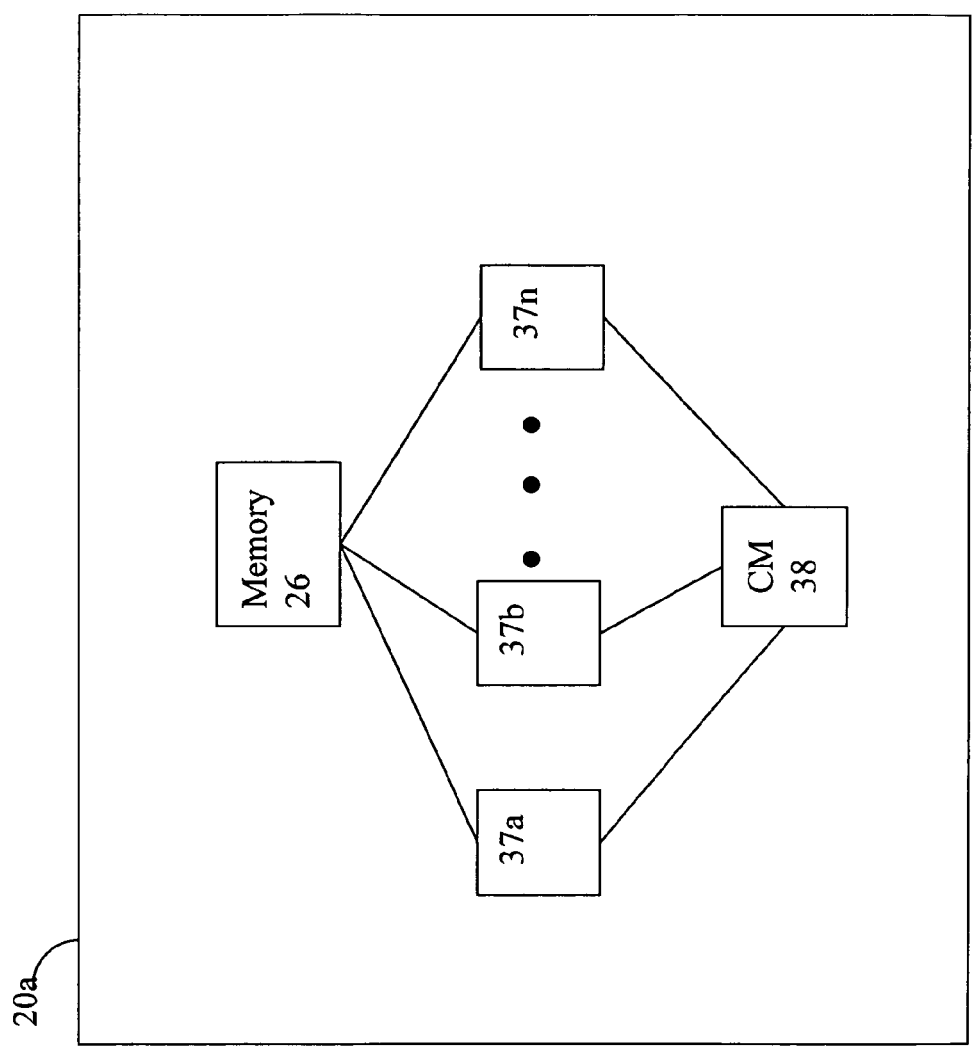
FIG. 2 is a representation of the logical internal communications between the directors and memory included in one embodiment of data storage system of FIG. 1.

Referring to FIG. 2, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with embodiment.

The representation of FIG. 2 also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

With reference back to FIG. 1, components of the data storage system may communicate using GM 25b. For example, in connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host. In connection with a write operation, an embodiment may first store the data in cache included in a portion of GM 25b, mark the cache slot including the write operation data as write pending (WP), and then later destage the WP data from cache to one of the devices 16a-16n.

As described above, the data storage system 12 may be a data storage array including a plurality of data storage devices 16a-16n in which one or more of the devices 16a-16n are flash memory devices employing one or more different flash memory technologies. In one embodiment, the data storage system 12 may be a Symmetrix® DMX™ data storage array and/or a CLARiiON® data storage array by EMC Corporation of Hopkinton, Mass. In the foregoing data storage array, the data storage devices 16a-16n may include a combination of disk devices and flash devices in which the flash devices may appear as standard Fibre Channel drives to the various software tools used in connection with the data storage array. The disk devices may be any one or more different types of disk devices such as, for example, an ATA disk drive, FC disk drive, and the like. The flash devices may be constructed using different types of memory technologies such as nonvolatile semiconductor NAND flash memory forming one or more SLC (single level cell) devices and/or MLC (multi level cell) devices. Additionally, flash memory devices and disk devices are two exemplary types of devices that may be included in a data storage system used in connection with the techniques described herein.

In connection with configuring and managing data storage for an application or other entity that may be characterized as a data storage consumer, data storage requirements may be specified in terms of goals. Goals may be characterized as objectives expressed using one language and terminology. Goals may relate, for example, to performance, availability, protection, cost, and the like. Performance goals may include goals related to various aspects of I/O performance such as I/O throughput, write request response time, read request response time, and the like. Availability may relate to the availability of a data storage system and/or devices in the data storage system. A customer may have a service level agreement (SLA) specifying a level of system or device availability to be maintained. Availability of a data storage system may expressed as a percentage value representing an amount of time that a system, or one or more devices, is up and in a functioning condition and has not experienced a failure. Availability calculations may be performed for a data storage system or one or more devices in the data storage system. Availability calculations are known in the art and are also described, for example, in U.S. patent application Ser. No. 12/215,432, filed Jun. 27, 2008, TECHNIQUES FOR OBTAINING A SPECIFIED LIFETIME FOR A DATA STORAGE DEVICE, which is incorporated by reference herein. Protection may relate to data protection policy objectives expressed in terms of different criteria or objectives that may be specified, for example, in an SLA. Such data protection objectives may include a recovery point objective (RPO), a recovery time objective (RTO), and/or a number of data copies retained. RPO may be defined as the amount of data lost upon the occurrence of an incident causing data failure where the amount of data lost is measured in time. RTO may be defined as the duration of time within which a business process should be restored after a data failure in order to avoid unacceptable consequences associated with a break in continuity regarding availability of the affected data. In other words, RTO may be expressed as an amount of time it takes to restore data for use upon the occurrence of a data failure. RTO and RPO are known in the art and also described, for example, in U.S. patent application Ser. No. 12/214,667, filed Jun. 20, 2008, TECHNIQUES FOR DETERMINING AN IMPLEMENTED DATA PROTECTION POLICY, which is incorporated by reference herein. Cost goals may relate to monetary costs associated with data storage devices utilized for storing data. Cost goals may be expressed, for example, as a cost per unit of storage (e.g., 10$/GB).

A data storage administrator may be presented with a set of goals such as one or more of the foregoing. The data storage administrator is then faced with the task of implementing the goals using existing storage management tools. As described above, the goals may be expressed using a first language and associated terminology. The management tools typically have an interface which uses a second language and terminology different from the first language and associated terminology. The management tools typically describe data storage system resources such as physical resources and services that may be included in a particular data storage system. For example, the management tools may include terminology related to physical devices, physical device characteristics (e.g., types of physical devices, disk speed such as in RPMs), RAID levels and configurations, different replication services (such as particular software used in the data storage system providing data replication), allocation of cache, processors used to service an I/O request, and the like. The management tools may allow for specifying aspects of the data storage system which are dependent on the particular physical data storage system configuration such as, for example, vendor, software services used to provide data replication, devices, and the like. Difficulties may be encountered in that the administrator has to be familiar with both the first and second languages and terminologies. Additionally, the administrator maps the goals to particular data storage system resources used to implement the goal by selecting particular data storage system resources. In other words, the data storage system administrator expresses the goals in terms of data storage system resources. It may be difficult for the administrator to perform the foregoing. It may also be difficult for the administrator to ascertain, for a given selection of data storage system resources, whether the one or more goals are met and accordingly make any needed adjustments. Determining whether goals are met or implemented correctly depends not only on the data storage system resources selected, but also on dynamic aspects of the data storage system. Such dynamic aspects may change over time and may relate, for example, to the current workload of the data storage system. The dynamic aspects may include, for example, aspects related to current I/O performance such as AST (average service time) representing the average amount of time it takes to service an event (e.g, service an I/O request), ART (average response time) based on the AST, and the average amount of time the I/O request waits. Dynamic aspects may also include, for example, utilization of different data storage system resources (e.g., particular logical or physical devices, CPU), measurement of cache hits and/or misses, and the like. The dynamic aspects may vary with application workload, such as when particular applications may be more heavily performing I/O operations.

Thus, it may be difficult to implement goals due to the fact that the goals depend on multiple factors. The factors may include static factors, such as physical characteristics of the resources selected, as well as other dynamic aspects or factors of the data storage system that may change over time. As such, due to the difference in interfaces and the dependence of the goals on both static and dynamic factors, it is difficult for the storage administrator to effectively implement the goals, and also determine adjustments as needed over time in order to achieve and maintain the goals. Using existing techniques to implement one or more goals may result in incorrect provisioning of data storage system resources for one or more application. The problems and difficulties experienced may also increase as the complexity of the data storage system and environment increase.

What will be described in following paragraphs are techniques that may be used in connection with implementing one or more goals in a data storage system. Additionally, the way in which the goals are implemented may be automatically monitored and adjusted over time to achieve and maintain the goals. A goal may be implemented by binding data storage system resources for use by an application or group of applications. As described in more detail below, one or more tiers may be defined. The tiers may specify a partitioning of applications and other entities characterized generally as consumers of data storage system resources. An embodiment using the techniques herein may define a hierarchy of multiple tiers. The tiers may be associated with different service levels or classes of applications or other data storage consumers. A set of data storage resources, such as logical and/or physical devices, a portion of cache, and services, such as a software vendor's service for providing data replication, may be bound to, or designated for use by, consumers in a particular tier. The set of resources associated with or designated for use by a tier may be characterized as a dynamic binding in that the particular set of data storage system resources utilized by consumers in a tier may vary from time to time. In accordance with techniques herein, the foregoing set may be adjusted by code on the data storage system performing automated techniques herein in accordance with clauses defining each tier, associated relative clause priorities, a current configuration for the data storage system, static aspects of the current data storage system resources (e.g., types of devices, device storage capacity and physical device characteristics related to speed and time to access data stored on the device), and current workload and other dynamic aspects (e.g., actual observed performance and utilization metrics) of the data storage system at different points in time.

Described in following paragraphs is a data storage management system paradigm used to define a service level abstraction including one or more tier definitions for one or more corresponding tiers. The abstraction described herein provides for defining a tier in terms of clauses. The clauses may include one or more goal clauses and/or configuration clauses. The goal clauses specify the goals or objectives. The configuration clauses may be characterized as specifying data storage system configuration characteristics dependent on data storage system resources used when implementing a data storage request for a consumer of the tier. For example, a request to provision storage for an application in the tier may be implemented using a data storage device having physical characteristics specified in a configuration clause. The goals for the application in the tier are specified in one or more goal clauses for the tier. Using the techniques herein, goal clauses and configuration clauses specified for a tier are considered in a prioritized fashion when initially selecting a set of data storage system resources bound to the tier. Furthermore, using the techniques herein, the foregoing clauses and relative priorities thereof are also considered when performing processing to select and tune the set of resources used by the tier at varying points in time.

Figure 3:
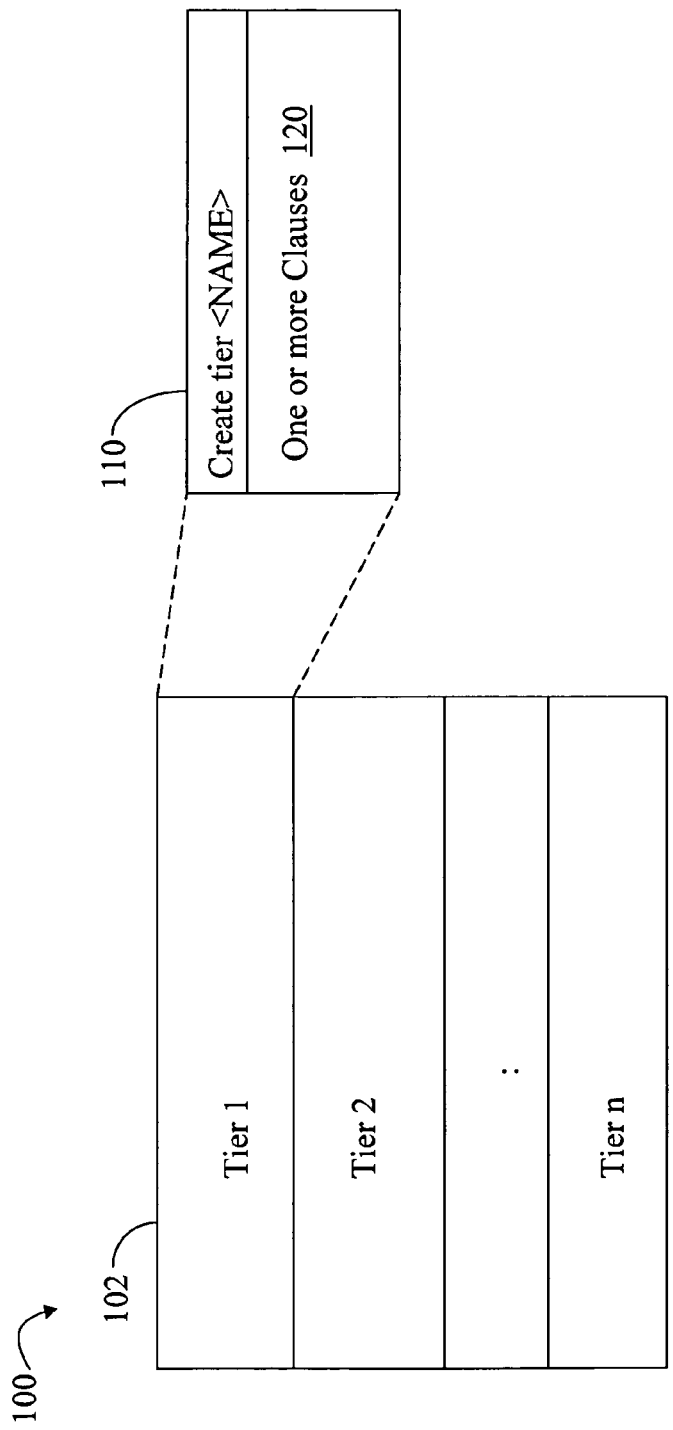
FIG. 3 is an example representing a set of tier definitions as may be used in an embodiment with the techniques herein.

Referring to FIG. 3, shown is an example illustrating tiers and associated definitions as may be utilized in an embodiment in accordance with techniques herein. The example 100 includes a set of one or more tiers 102. Each tier, such as tier 1, may be creating by specifying a tier definition 110. In one embodiment, the tier definition 110 may include one or more lines of text in a language which may be subsequently processed by code on the data storage system. The tier definition 110 defines a tier indicated by <NAME>. The tier definition may include one or more clauses 120. As described above, the clauses of 120 may include one or more goal clauses and/or one or more configuration clauses. Examples of the foregoing clauses are described in more detail elsewhere herein.

Figure 4:
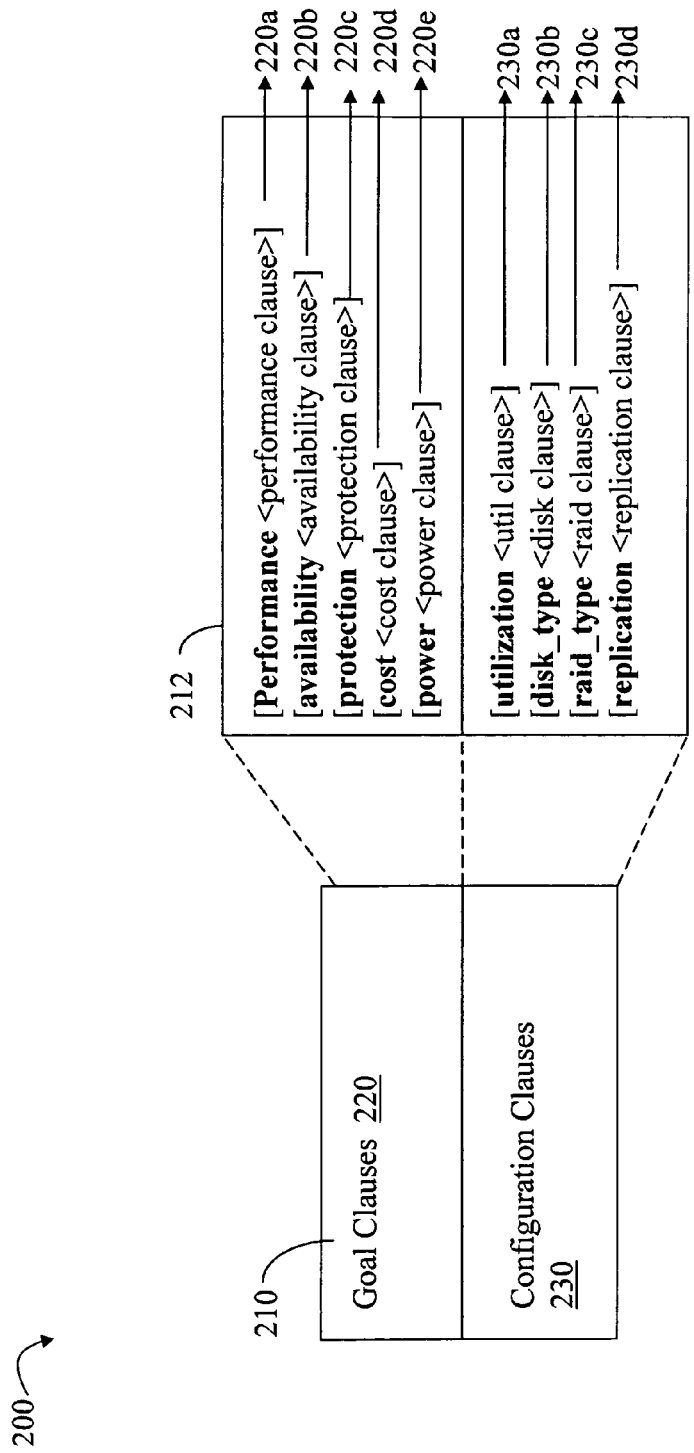
FIGS. 4, 5 and 6 are examples illustrating in more detail configuration clauses that may be included in a tier definition in an embodiment using the techniques herein.

Referring to FIG. 4, shown is an example 200 providing additional detail regarding the clauses that may be included in a tier definition in an embodiment using the techniques herein. A tier definition 210 may include one or more goal clauses 220 and/or one or more configuration clauses 230. Examples of goal clauses and configuration clauses are illustrated in 212. It should be noted that although 210 shows the goal clauses as a first group followed by the configuration clauses as a second group, such placement and grouping of the clauses may not be required. In one embodiment, the goal clauses and configuration clauses may be intermixed and may appear in any desired order. The order in which the one or more clauses of a tier definition are specified may indicate a relative prioritization of the clauses used in connection with binding data storage system resources for a tier. As dynamic aspects of the data storage system change over time, adjustments can be made as necessary to the data storage system resources bound to a tier.

In this example, goal clauses 220 may include one or more of the following: a performance clause 220a, availability clause 220b, protection clause 220c, cost clause 220d, and power clause 220e. As described above, goal clauses may be expressed in terms of objectives or goals to be achieved and maintained. The performance clause 220a may specify one or more performance goals. Examples of performance goals are mentioned elsewhere herein. In connection with specifying a value in connection with the performance clause, or more generally any clause, the value may be represented in a variety of different ways. Such values may be specified, for example, using percentages, absolute values, defined terms or classifications associated with one or more values, and the like. Examples are provided at various points herein.

The availability clause 220b may specify the availability of one or more data storage systems including devices used by the tier for data storage. The availability clause may also indicate the availability of one or more devices in the data storage system where the one or more devices may be used for data storage for consumers of the tier being defined. An availability may be expressed in any one of a variety of different forms. For example, availability may be expressed as a percentage, an amount of time expressed in terms of varying units of time with respect to a defined time period (e.g., # of hours/day, # days/year, # hours/year, and the like) that a system or device is available.

Data protection goals as specified with the protection goal clause 220c may be achieved by performing a data protection process using any one or more different data protection methods and facilities or products that may be available in a data storage system. As described above, RTO and RPO are examples of data protection goals that may be specified in one embodiment providing a protection clause.

The cost clause 220d may specify cost goals or objectives for data storage used by consumers in the tier. Cost may be expressed, for example, as a cost per unit of storage. The power clause 220e may specify power goals or objectives. Power goals or objectives may relate to an amount of power consumed by the devices associated with storing data for consumers in the tier. The power goal may indicate whether or not a user would like to conserve power in the tier. One or more different operations may be performed in order to consume power in connection with devices associated for use by the tier. For example, if not all disk devices associated with the tier are currently being used to store data for consumers of the tier, the unused disk devices may be spun down until used for data storage by tier consumers. For example, if the application data can be stored on only a portion of the disks in the tier, then remaining disks may be spun down if the power goal indicates to conserve power for the tier. If the tier definition, for example, specifies a 60% utilization clause, the storage system may fill up one disk after another up to 60% (IO) utilization while leaving the remaining 40% unused. As more storage is needed to maintain the 60% utilization, more disks can be powered up.

Configuration clauses 230 provide exposure of the underlying data storage system characteristics and particulars and may be characterized as low level, or data storage system dependent so that they may be customized for, and vary with, the particular storage vendor and associated options. Configuration clauses 230 may be expressed in terms of low-level or data storage system specific configuration characteristics and may identify particular facilities, technologies, resource characteristics (such as physical device or other physical characteristics), and the like, used to implement different goal clauses. Configuration clauses may be expressed with terminology typically used in connection with an existing data storage system management tool, and provide a user with a greater level of control and reduced automation in specifying the data storage system resources (e.g., devices, services, facilities and technologies) used.

More generally, configuration clauses may specify implementation criteria affecting how the goal clauses are implemented. Code on the data storage system may provide for automatically determining how to implement and achieve the requirements of the goal clauses, if any, in accordance with the implementation criteria of the configuration clauses, if any. If a tier definition includes no configuration clauses and only goal clauses, the data storage system may automatically determine how to implement all aspects of the goal clauses without considering any user-specified implementation criteria. Generally, the larger the number of configuration clauses specified, the greater the level of user control in implementing the goal clauses. As described in more detail elsewhere herein, a priority of the goal and/or configuration clauses may be specified so that the code in the data storage system that automatically determines how to implement a goal considers this priority when making implementation decisions and evaluating different possible options. As described in more detail herein, the relative priority of the clauses in a tier may be used in determining what data storage system resources are bound to a tier at a point in time should there be a conflict between criteria of different clauses. In other words, if it is not possible to satisfy the criteria of all the clauses for a tier, the priority is used in determining which clause and associated criteria are given a higher priority relative to other clauses for the tier.

In the example 200, configuration clauses 230 may include one or more of the following: a utilization clause 230a, disk type clause 230b, raid type clause 230c, and a replication clause 230d. The utilization clause 230a may specify one or more utilization levels for one or more devices or other resources of the data storage system. The particular device or other resources may be selected for use by the tier in accordance with a specified level of utilization. Utilization may be expressed, for example, as a percentage indicating an amount of usage with respect to time period. Disk type clause 230b may specify one or more physical disk characteristics such as, for example, indicate a particular type of disk drive and additional disk drive-specific attributes. It should be noted that an embodiment may include, more generally, a device type clause indicating one or more physical device characteristics where the device can be a disk, tape, flash drive, and the like. The raid type clause 230c may indicate a particular RAID level and/or RAID device configuration. The replication type clause 230d may indicate a replication facility or service used to provide data replication. The specified replication service or facility may affect, for example, how RTO and RPO goals are implemented. The replication facility or service available may vary with data storage system, vendor, software/hardware included in the data storage system, and the like. As described in more detail below, the replication clause 230a may identify the particular facility used to provide a data storage service. The facility may be, for example, the vendor-specific software or implementation used to provide the data replication service. For example, a variety of different facilities may be used to provide data replication such as, for example, RDF (Remote Data Facility), BCVs (business continuance volumes) by EMC Corporation, vendor-specific facilities which utilize an underlying storage technology such as providing a snapshot, and the like.

In connection with protection goals such as RTO and RPO, a data protection process may be used to provide copies of data, or portions thereof, by copying data from an original source to another device used to provide the copy for use should there be a data failure with respect to the original copy. Different data protection methods in which the original data may be copied may use different technologies in providing the data protection. For example, an embodiment may use data protection methods including one or more methods for providing different types of data backups, snapshots, continuous data protection schemes, and other methods used to more generally provide a copy of data for storage on data protection (DP) devices (e.g., these may be in the same or different data storage system, and may also be located at a same or a different physical location). Continuous data protection (CDP) refers to a DP method of providing a copy of an original data set by automatically saving a copy of every change made to that data capturing every version of the data that the user saves. CDP allows the user or administrator to restore data to any point in time.

Different facilities or services, such as vendor-specific products, may be used in providing one or more data protection methods. As mentioned above, each data protection method may utilize a different underlying technology to provide data protection. Furthermore, an embodiment may use one or more facilities or services which each use a same DP method. Such facilities or services may be specified in the replication clause. For example, a version of RDF may be a facility providing continuous data protection and the replication clause may specify that RDF, or a particular type of RDF, is to be utilized. In an embodiment in which data storage systems are remote or local with respect to one another, the data storage systems may communicate with one another using RDF. The RDF functionality may be facilitated with an RA which is an RDF adapter provided within communicating data storage systems. Communication between Symmetrix™ data storage systems using RDF is described, for example, in U.S. Pat. Nos. 5,742,792 and 5,544,347, both of which are incorporated by reference herein. As another example, the replication clause may indicate that BCVs (Business Continuance Volumes) are used in providing data replication. BCVs, and data operations used in connection therewith, are described, for example, in U.S. Pat. No. 6,101,497, filed on Apr. 25, 1997, which is herein incorporated by reference. The foregoing are two examples of what may be specified in a replication clause in an embodiment.

It should be noted that the clauses may be expressed in a variety of different forms using a variety of different languages and syntaxes. Particular examples herein are provided for purposes of illustration. In one embodiment, the clauses may be specified using a scripting language where the tier definitions are processed by a script processor.

The tier definition may include goal clauses which are, as described above, in the first language used to typically specify objectives or goals. The tier definition may also include configuration clauses which are, as described above, in the second language as typically used by data storage management tools. The configuration clauses specify low-level, data storage system configuration characteristics dependent on a data storage system resource or service used for implementing a data storage request for a consumer of the tier. With configuration clauses, the user specifies characteristics that may directly impact or effect a particular resource, or service, or an amount of a resource, selected for use in connection with data storage for the associated tier. Code of the data storage system automatically maps the goals of the goal clauses to a set of data storage system resources used for the tier and its data storage. Configuration clauses allow a user to specify low-level data storage configuration characteristics which may restrain or restrict the set selected by the code automatically selecting the set. The configuration clauses specify additional, data storage system specific aspects which may be used in selecting the set. The relative priority of the clauses affects the priority of the criteria specified in the clauses when selecting the set. The code selecting the set considers the goals (of the goal clauses) in combination with any low level data storage system-specific characteristics and other criteria (as expressed in configuration clauses).

Use of a paradigm for data storage management with service level abstraction including tier definitions with clauses as just described provides a flexible approach. The foregoing is flexible in that tier definitions may include one or more clauses, where the one or more clauses may include one or more configuration clause and/or goal clause. The user selects the number and type of goal and/or configuration clauses as well as a prioritization of the clauses. At a minimum, a tier definition may include a single goal clause or a single configuration clause. As described above, specifying configuration clauses provides a way for a user to have a greater level of control in connection with data storage system management and selecting what resources are bound to, or used by consumers of, a tier. In one aspect, a user provides for varying levels of automation and/or control by the number, type, and prioritization of selected clauses included in a tier definition.

For example, at a first point in time, a user may not readily adopt or be receptive to, using automated techniques described herein and may not want to relegate one or more aspects of control related to data storage system management affecting the data storage system resources utilized by a particular application or service level. At the first point in time, a tier definition may include a set of goal clauses and a set of configuration clauses. At a later second point in time, the user may be more accepting and willing to utilize a greater level of automation than at the first point in time. At this second point in time, the user may adjust the tier definition to remove all configuration clauses so that the goals may be implemented completely in an automated fashion without considering any configuration clauses. In other words, specifying only goal clauses may be characterized as providing the greatest level of automation in connection with data storage management using the techniques herein in accordance with best practices embodied in the code performing the automation. Thus, the techniques herein may be customized for a desired level of automation by simply varying the particular clauses and associated priority.

The relative priority of the clauses may be used in evaluating and selecting different options for the data storage system resources used by consumers of a tier. Ideally, a set of data storage system resources is selected which meets or does not violate any criteria included in the clauses. In the event that the set may be constructed in a variety of different ways and one or more criteria of one or more clauses are violated, the relative priority of the clauses may be used in making a selection of the set constructed in accordance with best practices. As described in more detail in following paragraphs, the relative priorities of the clauses may be used in weighting and selecting different candidate sets of data storage system resources bound to a tier at different points in time.

Figure 5:
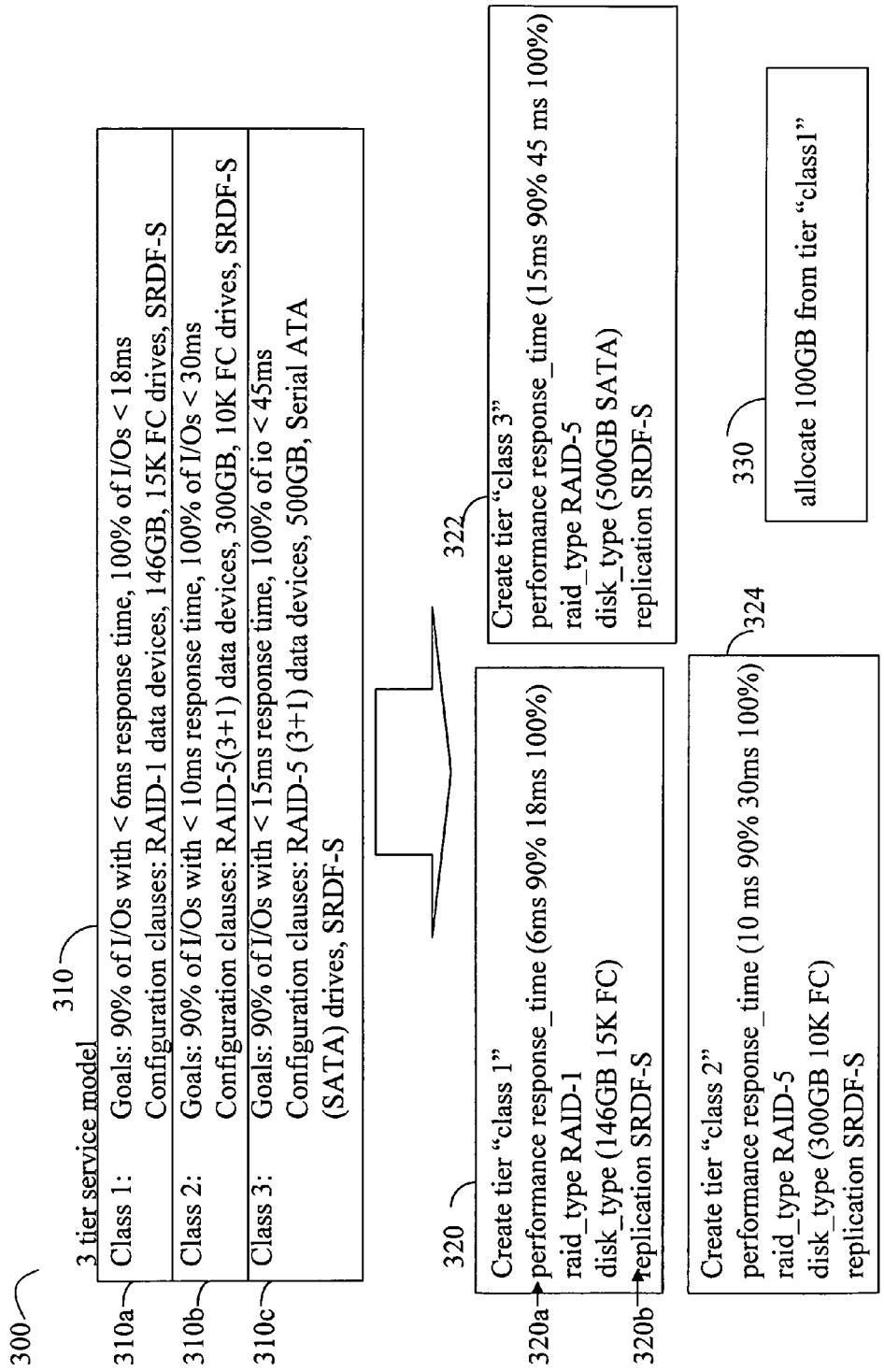

Referring to FIG. 5, shown is an example illustrating a 3 tier service model defined using the techniques herein. The example 300 includes an element 310 expressing informally the goal and configuration clauses for each tier. Element 310 includes a first tier, class 1, in 310a with goals which are performance goals specifying that 90% of the I/Os have a response time less than 6 milliseconds (ms) and 100% of the I/Os for the tier have a response time less than 18 ms. Element 310a also includes configuration clauses which specify that RAID-1 is used, disks are used which have a physical disk characteristics of 146 GB storage capacity, 15K RPM, and is a fibre channel (FC) drive, and synchronous RDF is used to provide data replication. Element 320 represents an expression of the information included in 310a in a particular format and language using clauses as previously described.

Element 310 includes a second tier, class 2, in 310b with goals which are performance goals specifying that 90% of the I/Os have a response time less than 10 milliseconds (ms) and 100% of the I/Os for the tier have a response time less than 30 ms. Element 310b also includes configuration clauses which specify that RAID-5 is used, disks are used which have a physical disk characteristics of 300 GB storage capacity, 10K RPM, and is a fibre channel (FC) drive, and synchronous RDF is used to provide data replication. Element 324 represents an expression of the information included in 310b in a particular format and language using clauses as previously described.

Element 310 includes a third tier, class 3, in 310c with goals which are performance goals specifying that 90% of the I/Os have a response time less than 15 milliseconds (ms) and 100% of the I/Os for the tier have a response time less than 45 ms. Element 310c also includes configuration clauses which specify that RAID-5 is used, disks are used which have a physical disk characteristics of 500 GB storage capacity for SATA type drives, and synchronous RDF is used to provide data replication. Element 322 represents an expression of the information included in 310c in a particular format and language using clauses as previously described.

The clauses in each of the tier definitions 320, 322 and 324 may have a relative priority indicated by the physical ordering of the clauses. In this example, the clauses illustrated may have a descending order of relative priority in accordance with the order of the clauses encountered when reading from top to bottom, and, within a same line, from left to right. It should be noted that in the syntax of FIG. 5, a clause, such as the disk type clause, may include one or more criteria, and such criteria within a line may have a same priority or, alternatively, a relative descending priority within the line specified when reading the line from left to right. Although the example 300 illustrates all configuration clauses grouped together, goal clauses and configuration clauses may be intermixed. For example with reference to element 320, it may be a highest priority to use the replication facility indicated in line 320b. In this case, line 320b may be placed before line 320a to indicate this relative priority with all other clauses remaining as illustrated.

Element 330 may represent a subsequently issued request to provision 100 GB of storage from tier class 1. The foregoing provisioning request may be implemented using a set of data storage system resources determined using the criteria expressed in 310a and 320. If possible, the set may be determined as meeting all criteria in all clauses for the tier class 1. If it is not possible to construct a set from which to allocate storage for the request which meets all the criteria of all the clauses, then a set may be constructed which is otherwise determined as a best option in accordance with selection criteria. The resulting set may be selected from one or more possible candidate sets determined in accordance with best practices for the particular data storage system. The one or more possible candidate sets may be ranked in accordance with the selection criteria. The selection criteria may include selecting the candidate set which satisfies or meets the largest number of clauses having the highest relative priority. The selection criteria may also include one or more factors determined through modeling each of the possible candidate sets to assess a potential adverse impact of binding a set of data storage system resources for a selected candidate set on clauses for a particular consumer, other consumers, if any, in the same tier, and also on other tiers. Selection criteria is also described in more detail elsewhere herein.

It should be noted that the selection criteria just described may be used in forming or binding an initial set of data storage system resources used for servicing a request. The selection criteria may be used in connection with implementing subsequent provisioning requests. As will also be described, the selection criteria may also be used in connection with automatically monitoring and tuning a system to make appropriate adjustments to the set in accordance with changes to the data storage system over time. Such changes may be due to static and/or dynamic characteristics of the data storage system. The adjustments made at a point in time may affect subsequent requests (e.g., subsequent provisioning requests and I/O requests). As will be described in more detail in following paragraphs, the adjustments made may also affect previously provisioned and utilized storage where the adjustments may include migrating currently stored data.

It should be noted that relative priority of clauses and criteria may be indicated in other ways besides physical position or order of appearance. For example, an embodiment may use a language that includes appropriate syntax for specifying a priority ordering of clauses and criteria included in the clauses. Criteria included in the clauses may be characterized as specifying that which is expected or desired.

Figure 6:
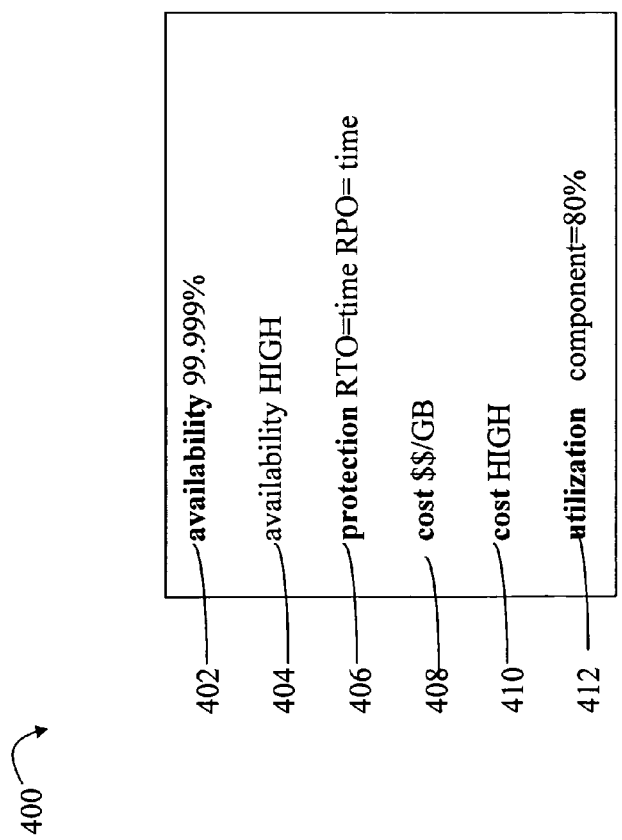

Referring to FIG. 6, shown is an example of alternative ways in which values may be specified for the different clauses described herein in an embodiment. Elements 402 and 404 indicate alternative ways in which availability may be specified. Element 402 uses a percentage. Element 404 may use a defined term or classification representing one or more numeric values. Element 404 specifies availability as HIGH where HIGH may be mapped to one or more numeric values. HIGH may be one term included in a set of multiple defined terms. For example, an embodiment may define the terms HIGH, MEDIUM and LOW and each may be associated with one or more numeric values. A user may be allowed to specify the term rather than a numeric value in one or more of the clauses. A script processor, for example, may process the tier definitions and perform any mapping from such terms to the appropriate numeric value(s). Element 406 specifies RTO and RPO using time values that may be expressed in some unit of time such as, for example, days, hours, minutes, and the like. Element 408 specifies cost in terms of dollars per unit of storage such as a GB of storage. Element 410 is another way in which a cost value may be specified using a defined term or classification as described in connection with 404. Element 412 specifies a utilization as a percentage for a particular component, such as a disk or other data storage system resource.

Figure 7:
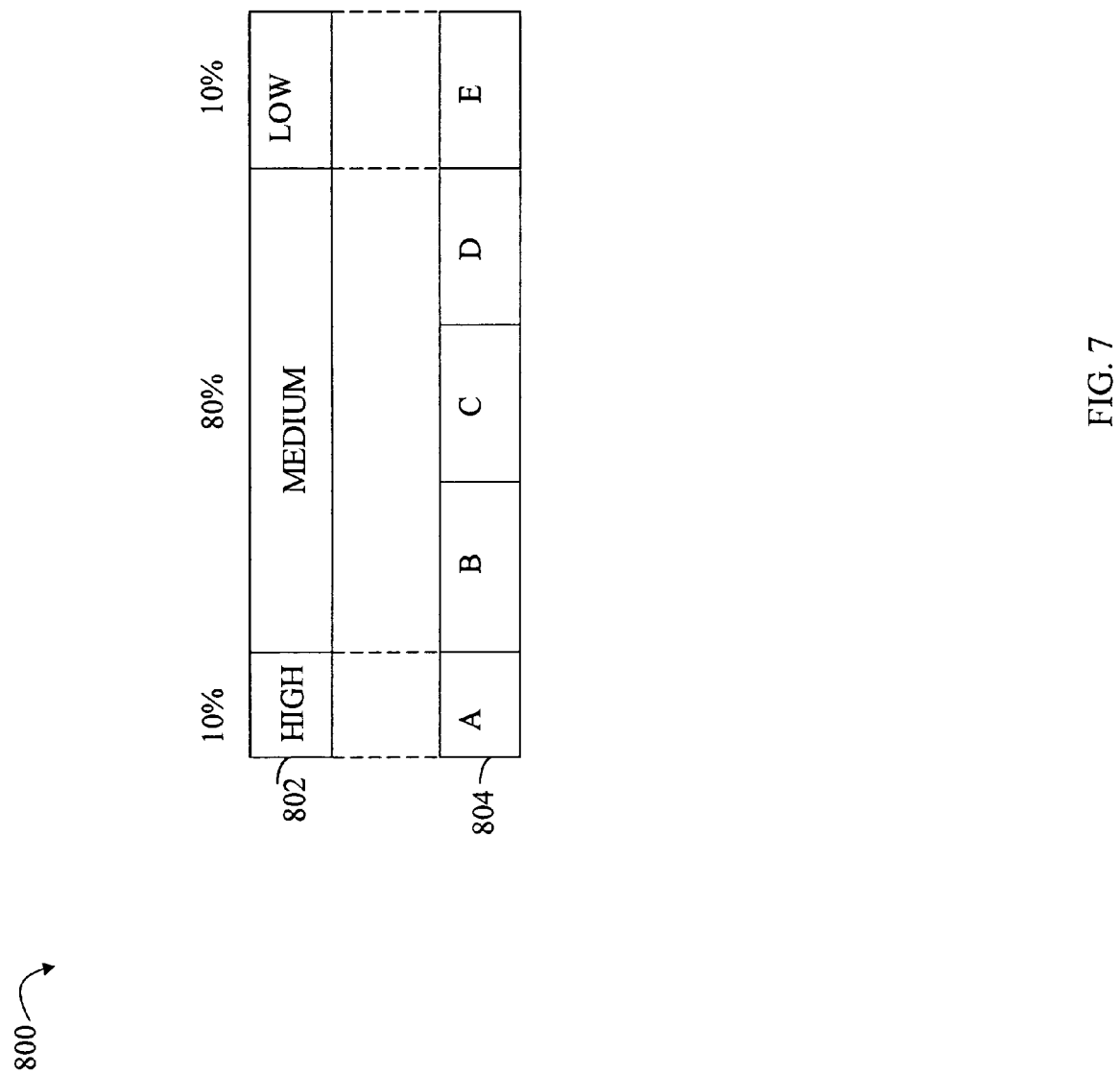
FIG. 7 is an example illustrating a mapping of a range of values to a set of terms representing different classifications as may be used in connection with specifying values for clauses in an embodiment using the techniques herein.

Referring to FIG. 7, shown in more detail is an example illustrating how one or more terms or classifications may be defined which are mapped to one or more numeric values. The example 800 illustrates mapping the terms of 802 which are HIGH, MEDIUM and LOW to different portions of a numeric range as represented by 804 based on percentage values associated with each term in 802. In this example, the range of possible values 804 may be partitioned into 5 portions each corresponding to 20% of the range. Portions of the range may be mapped to each of the terms in 802 based on percentages assigned to each of the terms in 802. The range of values represented by 804 may correspond to any possible range such as may be associated with cost. Thus, the terms HIGH, MEDIUM and LOW may be used to specify a cost value. A user may change a portion of the range of values associated with each term by reassigning percentages for each of the terms. In the example 800, the following percentages are associated with each term: HIGH=10%, MEDIUM=80%, and LOW=10%.

It should be noted that the range values associated with each term may also change without having the user modify the foregoing percentages. If the span of values associated with a range as represented by 804 changes and the same set of percentages is used with each range, the portion of range values associated with each of the terms HIGH, MEDIUM and LOW will also vary with the range to percentage mapping. Thus, an embodiment may also allow a user to specify or define the range of values represented by 804. An embodiment may also provide for automatically specifying the range of values represented by 804 from collected or monitored data obtained from observing performance of the data storage system.

As an alternative to mapping terms defining classifications to a range of values, an embodiment may provide for assigning or mapping particular types of data storage devices with each of the foregoing cost classifications of HIGH, MEDIUM and LOW. For example, a cost/GB may be calculated for each type of storage device. An embodiment may then map each type of storage device based on cost/GB to one of the HIGH, MEDIUM or LOW cost classifications. The terms HIGH, MEDIUM and/or LOW may be specified in the COST clause rather than a numeric cost value. The percentages specified in the example 800 may be used in grouping or classifying the devices into different cost classifications. Based on the foregoing percentages, those devices categorized as the 10% most expensive (e.g., 10% of devices having the highest cost/GB) are associated with the HIGH classification, those devices categorized as the 10% least expensive (e.g., 10% of devices having the lowest cost/GB) are associated with the LOW classification, and the remaining devices are included in the MEDIUM classification.

Terms and associated classifications of two or more values may be defined for other clause values such as, for example, RPO and RTO values. The terms and associated classifications may also be used with clauses having values that change over time or may be characterized as dynamic, such as those related to aspects of data storage system performance. For example, a metric may be defined related to I/O performance and the relative terms FAST, MEDIUM, and SLOW may be defined using percentages such as illustrated in FIG. 7. A range of values for the metric may be determined based on collected data over a time period. The range of values for the metric may be mapped to the different classifications of FAST, MEDIUM and SLOW based on percentages associated with each classification. The range spanning from a minimum value to a highest value may vary with observed or gathered performance data at different points in time. Thus, without modifying the percentages, the data storage system may automatically determine the range of values used for I/O performance metric causing the particular range values associated with each of FAST, MEDIUM and SLOW to change over time.

The foregoing are examples of how values may be defined and specified in clauses. As described above, the value may take a variety of different forms including absolute values as well as terms that are mapped to one or more numeric values.

Figure 8:
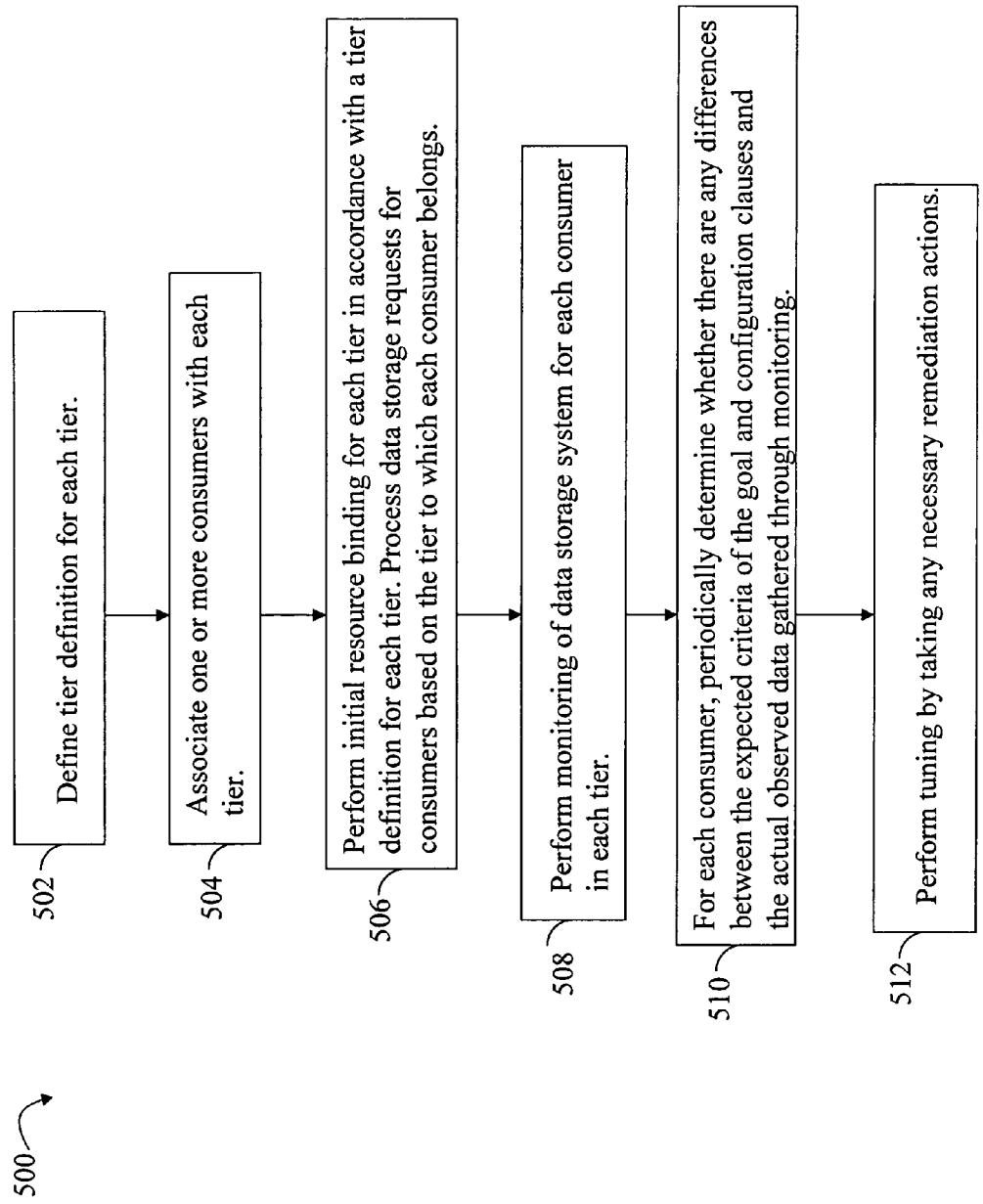
FIGS. 8, 9, 10 and 11 are flowchart of processing steps that may be performed in an embodiment using the techniques herein.

Referring to FIG. 8, shown is an example of a flowchart of processing steps that may be performed in an embodiment utilizing the techniques herein. The flowchart 500 includes processing steps described above. At step 502, a tier definition is defined for each desired tier. At step 504, one or more consumers are associated with each tier. Consumers may include, for example, applications that may be executing on a host. At step 506, an initial resource binding for each tier may be performed in accordance with the tier definition for each tier. The initial resource binding for a tier may result in a set of data storage system resources being selected for use in connection with processing subsequently issued commands and I/O requests for consumers of the tier. After the initial resource binding, data storage operations or commands, such as provisioning requests from a data storage administrator, and I/O requests, such as from a consumer application in a tier, are processed using the data storage system resources bound or associated with the tier determined in accordance with the tier definition. As an example, a first application may belong to a first tier where a first set of data storage system resources is initially bound for use by the first tier. A provisioning request may be received to provision storage for use by the first application and storage for the first application may be provisioned from devices included in the first set. The first application may perform write requests and such requests may result in data being stored on the provisioned devices. The amount of cache allocated for use when processing the write requests may be based on the first set. Ways in which an amount of cache may be allocated and varied for use by a tier are described, for example, U.S. Pat. No. 7,047,366, Issued May 16, 2006, Ezra, QOS Feature Knobs, which is incorporated by reference herein, and U.S. patent application Ser. No. 11/254,089, filed Oct. 19, 2005, DYNAMIC CACHE PARTITIONING, YOCHAI, et al., which is incorporated by reference herein. The data that is written by the first application may be replicated to other remote data storage systems using a facility such as RDF which may be specified using the first set.

At step 508, information may be gathered by monitoring the data storage system. The information gathered may include, for example, metrics related to dynamic characteristics of the data storage system. The information may include metrics related to I/O performance, response time, a number of cache hits, a number of cache misses, device utilization, and other information for each application as well as for each tier. The information may also include other types of changes made with respect to the data storage system resources. For example, new devices may have been added to the data storage system and information of step 508 may identify the new devices and associated characteristics of the new devices. At step 510, for each consumer in each tier, processing is performed periodically to determine whether there are any differences between the expected criteria as specified in the goal and configuration clauses and the actual observed data gathered through monitoring performed in step 508. At step 512, tuning of the set of resources currently bound to a tier may be performed by taking a remediation action, if necessary. Step 512 may include making any necessary adjustments to the set of data storage system resources bound to a tier in accordance with the prioritized clauses included in the tier definition. For example, step 510 may determine that a tier definition includes a performance clause at a highest priority and the performance clause criteria is currently not being met. In response, step 512 may result in selecting and implementing one or more different remediation actions in order to meet the performance clause criteria. Possible actions may include adjusting an amount of cache allocated for use by a tier, migrating data on currently provisioned storage device to another device with lower utilization and/or is faster than the currently provisioned storage device, and the like. When determining which one or more actions to take to adjust the set of resources associated with a tier when expected criteria (e.g., as specified in the goal and/or configuration clauses) is not being met, an embodiment may consider a variety of different selection criteria. With respect to implementing an action for a current clause for a current application, the selection criteria may include evaluating the clauses included in a tier definition in accordance with a relative priority of each clause for the application, assessing adverse impact on other applications in a same tier, assessing adverse impact on other tiers, and the like. The possible actions may be determined in accordance with best practices for the particular data storage system, applications included in a tier, and the like. Step 512 is described in more detail in following paragraphs. Steps 508, 510 and 512 may be performed automatically by code executing on the data storage system.

Figure 9:
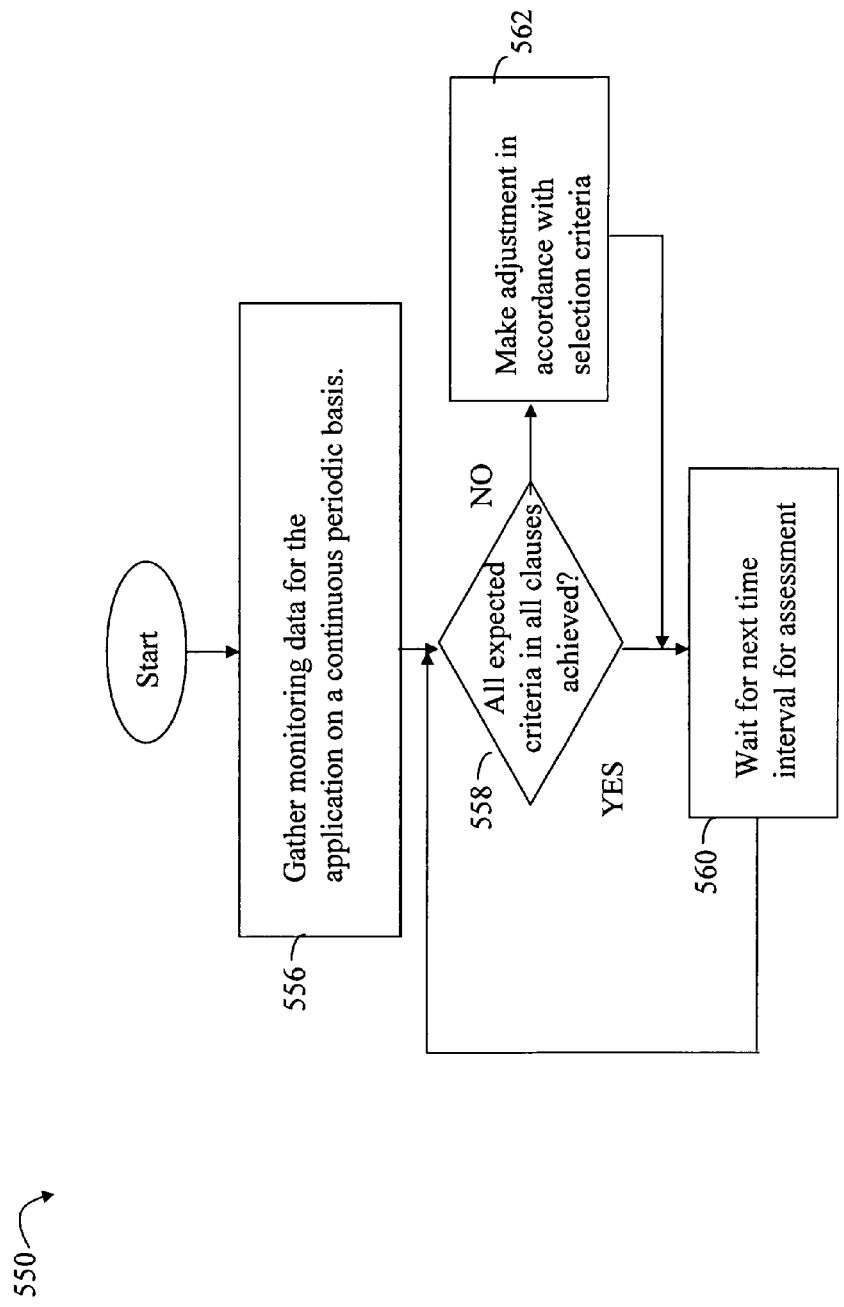

Referring to FIG. 9, shown is a flowchart providing additional detail regarding steps 508, 510 and 512 of FIG. 8. The steps of 550 are described with respect to a single application included in a tier although the steps may be performed with respect to other applications and consumers in the tier. At step 556, monitoring data may be gathered such as on a continuous periodic basis. As described above, the monitoring data describes the actual data storage system resources and performance. At step 558, a determination is made as to whether all the expected criteria included in all the clauses for the tier definition are met with respect to the single application being evaluated. If step 558 evaluates to yes, control proceeds to step 560 to wait for the next time interval for assessment to lapse. Control proceeds from step 560 to step 558. If step 558 evaluates to yes, control proceeds to step 562 where one or more adjustments may be made in accordance with selection criteria. From step 562, control proceeds to step 560.

Figure 10:
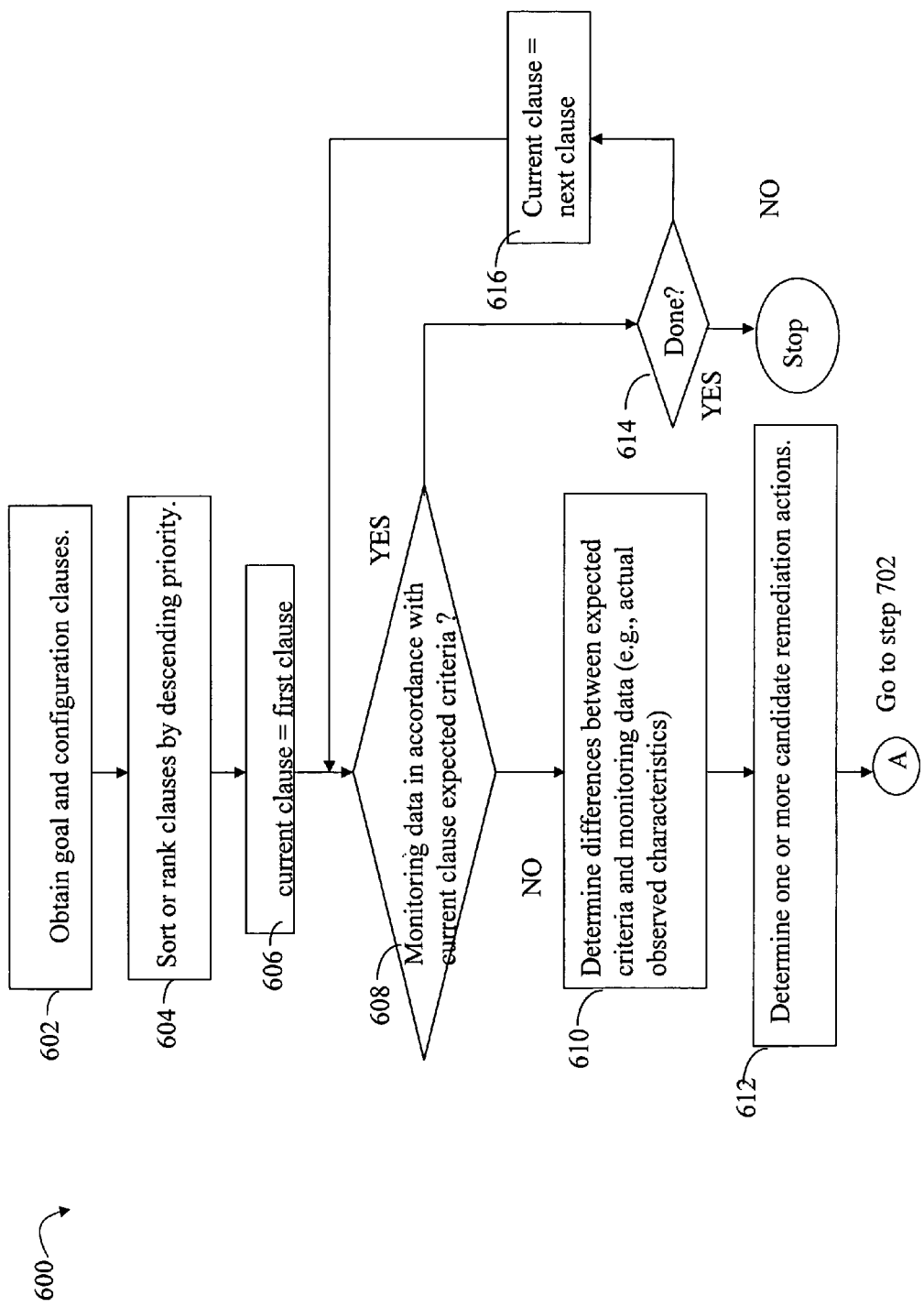
Figure 11:
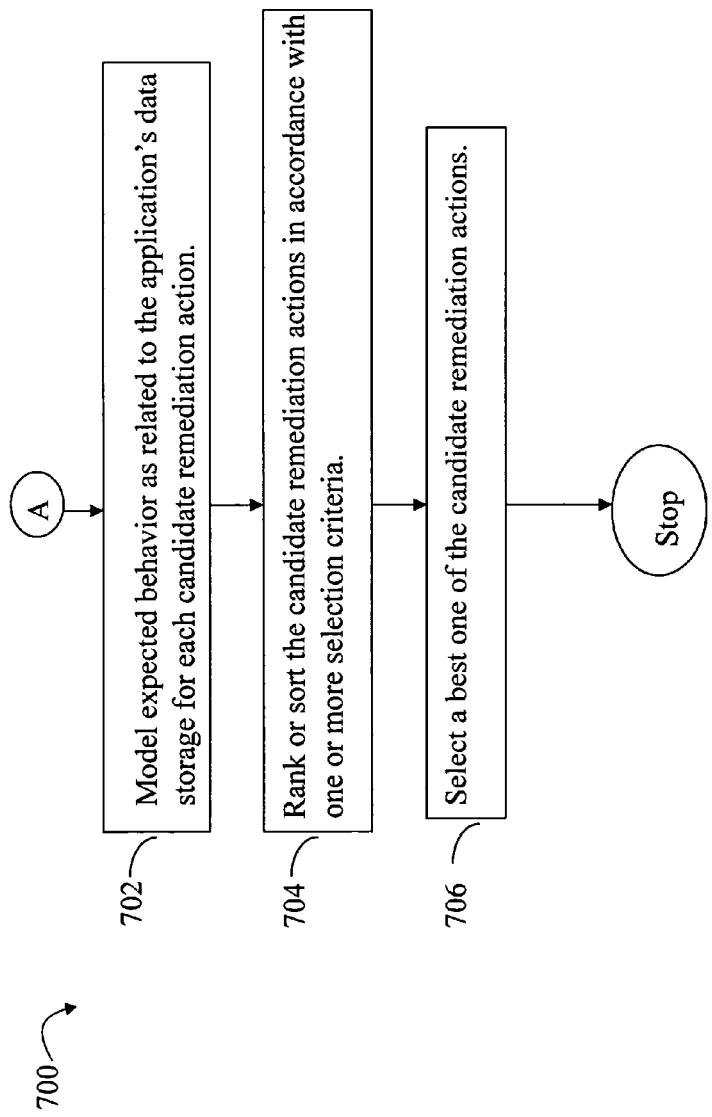

Referring to FIGS. 10 and 11, shown are flowcharts of processing steps providing additional detail regarding steps 510 and 512 of FIG. 8 that may be performed in an embodiment in accordance with the techniques herein. The description of flowchart 600 is made with respect to an application as a consumer belonging to a tier having a tier definition. At step 602, goal and configuration clauses for the tier definition are obtained. In step 604, the clauses are sorted or ranked by descending priority. At step 606, a variable, current clause, is used to denote the current clause being processed in flowchart 600. In step 606, the current clause is assigned the first clause in the ranking produced in step 604. At step 608, a determination is made as to whether the monitoring data obtained is in accordance with the expected criteria of the current clause. In other words, step 608 determines whether the expected criteria of the current clause is met. If step 608 evaluates to yes, control proceeds to step 614. At step 614, a determination is made as to whether all clauses in the tier definition have been processed. If so processing stops. Otherwise, control proceeds to step 616 where current clause is assigned to the next clause in the tier definition. From step 616, control proceeds to step 608 to process the next clause.

If step 608 evaluates to no, control proceeds to step 610 where differences between the expected criteria and the monitoring data reflecting the actual state of the data storage system are determined. Step 610 may include, for example, determining which metrics of the monitoring data are relevant and a difference between the expected and actual value. The difference may be used as a selection criteria in determining which remediation action to select in subsequent processing steps. The difference may also be used in determining an amount of an adjustment to be made such as adjusting an amount of a particular resource bound to the tier. For example, an amount of a resource, such as cache, may be increased in accordance with the size of the difference (e.g., larger differences may result in larger increase in amounts of cache associated with a tier). The difference may be used in selecting a particular device based on utilization, device characteristics, and the like.

At step 612, one or more candidate remediation actions are determined. As described herein, a remediation action may be characterized as an option which adjusts the data storage system resources bound to the tier. The one or more remediation actions may be determined in accordance with best practices for the tier. For example, a tier may include a particular type of application such as an email application. One or more of the candidate remediation actions may use a particular RAID configuration and/or set of devices customized for the email application in accordance with known best practices for the data storage system. In contrast, if the application is a database application, the one or more candidate remediation actions may use a different RAID configuration and/or set of devices in accordance with best practices.

From step 612, control proceeds to step 702 where the expected behavior of the data storage system may be modeled for each candidate remediation action. In other words, step 702 is part of assessing or evaluating the impact of implementing each candidate remediation action. Step 702 may include, for example, estimating the expected impact on the application (e.g. what is the effect on other clauses and expected criteria), estimating the impact of implementing each candidate remediation action on other applications in the same tier, applications in different tiers, and the like. Step 702 may be used in assessing the positive as well as adverse impact on other expected criteria for the current application as well as other applications in the same and/or different tiers. At step 704, the candidate remediation actions may be ranked or sorted in accordance with selection criteria. The selection criteria may include the expected criteria of the clauses for the tier definition associated with the application and the relative priority of the clauses. Step 704 determines whether other clauses as applied to the application are violated or met. Step 704 may also make a determination regarding how close an estimated metric value determined by modeling is with respect to the expected criteria of the clauses for each candidate remediation action.

In one embodiment, the selection criteria of step 704 may include primary selection criteria and secondary selection criteria. The primary selection criteria may use a prioritized list of the expected criteria of the clauses for the tier definition with respect to the application being evaluated. The secondary selection criteria may include considering adverse impact on other applications in the same and/or different tier. For example, it may be that two different remediation actions are estimated to result in meeting all expected criteria of all clauses for the current application. The secondary criteria may be used in selecting one of the foregoing two remediation actions once all primary criteria are met. Such secondary selection criteria may be optionally included in an embodiment. A step 706, the best one of the candidate remediation actions is selected. As described herein, the best candidate may be the candidate remediation action which is expected to correct any deficiencies with respect to meeting the current clause criteria, does not violate criteria of another clause having a higher priority than the current clause, and also has a minimum adverse impact on clauses having lower priority than the current clause (e.g., has the least number of criteria violations for clauses having the lower priority) with respect to the current application.

It should be noted that when performing steps 704 and 706, an embodiment may consider, using modeling, not only whether criteria of the clauses are met or violated, but also how close modeled conditions (i.e., determined as a result of implementing a selected action) are with respect to meeting one or more clause criteria. Thus, step 706 may select a candidate remediation action which, although may not be expected to meet criteria of the current clause, may result in modeled conditions indicating the greatest improvement with respect to the current clause criteria (e.g., the action which results in estimated modeled conditions which are closest to the current clause criteria).

It should be noted that the processing of FIGS. 10 and 11 may result in implementing a single remediation action. An alternate embodiment may also select and implement more than a single remediation action. Furthermore, the logical processing of FIGS. 10 and 11 stops processing the clauses of the tier definition once a remedial action has been selected. Rather than stopping processing for the current application once a single remedial action has been selected, an embodiment may also continue to process remaining lower priority clauses so that additional remedial actions are selected and implemented in a similar manner (e.g., flow of FIG. 11 from step 706 may proceed to step 614 of FIG. 10). In an embodiment in which multiple remedial actions are selected for implementation, the impact on the application of implementing all the remedial actions may be considered. For example, suppose 4 clauses—clause 1, clause 2, clause 3 and clause 4, are included in a tier definition and have a relative priority from highest to lowest with clause 1=highest and clause 4=lowest. Based on collected monitoring data, clause 1 is violated and clauses 2-4 are met. A first action is selected for implementation which is estimated (through modeling) to cause clause 1 to be met but is also expected to violate clause 2. Processing may be performed with respect to the remaining clauses 2, 3, and 4 based on the estimated conditions determined by modeling the effects when the first action is implemented rather than current actual conditions. Thus, after selecting the first action, an embodiment may continue to process the remaining clauses in the tier definition where actual conditions of the data storage system determined using monitored data may be updated by modeling implementation of the first action. In this example, modeling estimates that implementing the first action will cause clause 2 violations. Processing may be performed based on the modeled conditions associated with the estimated clause 2 violation even though clause 2 is not currently being violated as determined using the actual monitoring data. A second action may be selected which modeling determines will correct the estimated (or modeled) clause 2 violation without causing additional violations to any remaining clauses. Thus, an embodiment may select to implement both the foregoing first and second actions using updated current conditions based on modeling implemented actions from higher priority clauses.

It should also be noted that processing of FIGS. 10 and 11 for a current clause may not result in selection of any remediation actions if it is determined that no candidate remediation action is estimated to correct deficiencies with respect to the current clause without violating criteria of a higher priority clause. In such a case, additional logic may be added to processing of FIG. 11 to continue processing with the next clause.

To further illustrate use of the techniques herein, a more detailed example will be described. Consider an example for the following Tier 1 definition:

Performance Goal clause: performance should be no more than 6 ms response time for 90% of I/Os, and no more than 20 ms response time for all I/Os.

Cost Goal clause: cost should be no more than $10/GB

Device Configuration clause: storage should be on disks with 15K RPM

Raid Configuration clause: storage should be configured as RAID 5

Based on the foregoing Tier 1 definition for an application that belongs to Tier 1, code on the data storage system performing the techniques herein first attempts to satisfy the performance and cost goals (e.g., expected criteria of the goal clauses), followed, respectively, by the expected criteria of the device configuration clause and the raid configuration clause. Assume that initially all expected criteria of all 4 clauses for Tier 1 can be satisfied for the application. As time goes on, application performance deteriorates and only 70% of I/Os are determined as having a 6 ms response time or less. Based on continuous periodic monitoring as described herein, it may be determined that the performance goal is not achieved. Code on the data storage system may perform processing to try and take a corrective action to achieve the performance goal. The processing may include performing an analysis of the application's workload through monitoring data gathered. The analysis determines that there is a high percentage of cache read misses. Achieving the performance goal can be done by increasing the cache hit ratio, or by improving the response time associated with a read-miss. Thus, candidate remediation actions may include adjusting data storage system resources which attempt to increase the cache hit ratio and/or improve the response time experienced for a read miss operation.

Further analysis shows that there is little locality of reference in the application's I/O pattern (e.g., the application does not have a high rate of re-requesting a same portion of data) so that adding more cache for use by the application is not expected to improve the cache hit ratio. Thus, candidate remediation actions which include increasing the amount of cache for use by the allocation may have a lower ranking than other candidate remediation actions which do not increase the amount of cache. In the data storage system, there are a first set of devices that have better actual response times than a second set of devices currently used for storing the application data. In other words, monitoring data indicates that, on average, it takes less time to retrieve data from the first set of devices than to retrieve data from the second set of devices. Monitoring data may indicate that each device in the first set has a better average response time than any device in the second set. The foregoing first set of devices may be further divided into two categories, X and Y:

X: disks have very low utilization but are 10K RPM

Y: flash drives that have a very fast response time but are very costly.

Candidate remediation actions to achieve the performance goal may include migrating data from the current devices used for the application data. A first candidate remediation action may include migrating the application data to devices of category X. A second candidate remediation action may include migrating the application data to devices of category Y. Devices in category X may not violate the cost goal clause but do violate the device configuration clause. Devices in category Y may violate both the cost goal clause and the device configuration clause. Furthermore, each device in category Y may have a faster average response time than each device in category X. Thus, there is no remediation action which will meet all expected criteria of all clauses and selecting either the first or second remediation action to achieve the performance goal clause criteria will result in violation of one other clause. Processing is performed to first attempt to satisfy the higher priority performance goal clause and cost clause before the device configuration clause. As a result, the foregoing first candidate remediation action may be selected to migrate the application's data to the category X devices even though this action violates the device configuration clause. As a result of assessing the impact on other clauses, the first candidate remediation action may be selected even though devices of category Y have a better average response time than device of category X. The first action is estimated to meet criteria of both the performance and cost goal clauses and, in contrast, the second action is estimated to meet criteria of the performance goal and violate the cost goal clause. This is an example of how prioritization of the clauses and also considering adverse impact on other clauses for the application can impact the action selected for implementation. The foregoing candidate remediation action selected may be determined as a result of executing code performing processing steps described herein.

Figure 12:
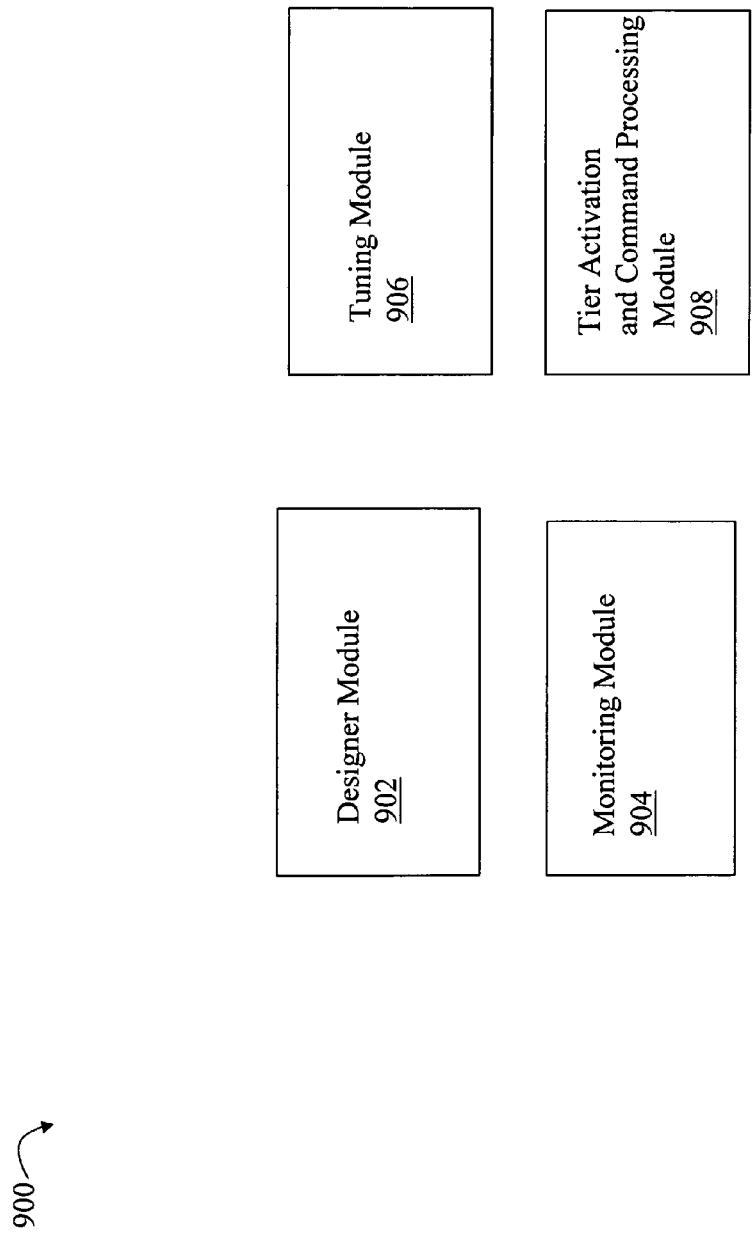
FIG. 12 is an example illustrating modules that may be included in a data storage system using the techniques herein.

Referring to FIG. 12, shown is an example of modules that may perform processing in an embodiment using the techniques herein. The example 900 includes a designer module 902, a monitoring module 904 and a tuning module 906. Designer module 902 may be used in connection with defining a tier such as, for example, specifying the different goal clauses. The designer module may analyze the current state of the data storage system including its configuration and workload. For example, the designer module may have information regarding the devices and associated characteristics, currently available replication facilities, cache size, metrics describing dynamic aspects of the data storage system reflecting the current workload, and the like. Such information may be viewed using the designer module so that a user can specify realistic expected criteria for the clauses. The designer module 902 may also include functionality for modeling and estimating conditions of the data storage system state based on different goals and expected criteria for one or more tiers. Once the tier definitions have been completed, the designer module 902 may store the tier definitions to persistent storage. The designer module 902 may also include functionality other than as described herein.

The monitoring module 904 may perform processing which performs continuous monitoring to collect monitoring data regarding the current workload of the data storage system as well as information regarding the current configuration such as existing physical and logical devices.

The tuning module 906 may perform processing which compares collected monitoring data (such as gathered by module 904) to expected criteria as included in the clauses for the active tier definitions. Module 906 may also perform processing to tune or adjust a set of data storage system resources bound to a tier at a point in time in accordance with the expected criteria for the clauses of the tier.

The tier activation and command processing module 908 may read and implement the persisted tier definitions. The module 908 may perform processing to implement data storage commands and operations such as, for example, provision storage for a request in the context of currently activated tiers. The module 908 may also include functionality which exposes legacy operations as may be utilized in an existing system. For example, module 908 may include a user interface which exposes the functionality of the data storage management tools having the second interface as described elsewhere herein.

In one embodiment, each of the foregoing modules may be implemented using code which is stored and executed on a data storage system such as a data storage array. As will be appreciated by those skilled in the art, an embodiment may implement the techniques herein using a different number of modules than as illustrated, may have different modules perform different combinations of processing than as described, and the like.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of configuring resources of a data storage system comprising:

providing a definition for each of one or more tiers, each of said one or more tiers corresponding to a different class of consumer of data storage system resources, each of said one or more tiers having a different corresponding definition including a set of one or more clauses and a priority of each clause in said set relative to other clauses in said set, each of said clauses in said set being one of a plurality of predefined types of clauses specifying expected criteria, said plurality of predefined types of clauses including at least one goal clause specifying an objective for said each tier and including at least one configuration clause specifying a data storage system configuration characteristic dependent on a data storage system resource used in connection with data storage for consumers of said each tier;
associating one or more data storage consumers with each of said one or more tiers;
associating a first set of data storage system resources with a first of said one or more tiers in accordance with a corresponding first definition for said first tier, said first so used when processing storage provisioning requests and I/O requests for data storage consumers associated with said first tier, wherein said first set of data storage system resources is selected in accordance with first expected criteria that is included in clauses of the first definition and that is prioritized based on first relative priorities associated with the clauses of the first definition, said first set of data storage system resources having actual characteristics in accordance with the first relative priorities and the first expected criteria;
periodically determining whether the first expected criteria are met; and
automatically adjusting the first set of data storage system resources in accordance with the first expected criteria and the first relative priorities if the first expected criteria are not met.

2. The method of claim 1, wherein said at least one goal clause includes at least one of a performance goal clause specifying an I/O performance goal, an availability goal clause specifying a level of availability, a protection clause specifying a recovery time objective, a protection clause specifying a recovery point objective, a cost clause specifying a data storage cost per unit of storage, and a power clause.

3. The method of claim 1, wherein said at least one configuration clause includes at least one of a utilization clause specifying a level of utilization of a data storage system component, a device type clause indicating a type of data storage device, a RAID type clause indicating a RAID level, and a replication clause indicating a data replication facility used to provide data replication.

4. The method of claim 1, wherein one of said data storage system consumers is an application, and said first definition is used in determining an amount of cache in the data storage system which is included in said first set for use in connection with processing I/O requests for the application.

5. A method of configuring resources of a data storage system comprising:
providing a definition for each of one or more tiers, each of said one or more tiers corresponding to a different class of consumer of data storage system resources, each of said one or more tiers having a different corresponding definition including a set of one or more clauses and a priority of each clause in said set relative to other clauses in said set, each of said clauses in said set being one of a plurality of predefined types of clauses, said plurality of predefined types of clauses including at least one goal clause specifying an objective for said each tier and including at least one configuration clause specifying a data storage system configuration characteristic dependent on a data storage system resource used in connection with data storage for consumers of said each tier;
associating one or more data storage consumers with each of said one or more tiers; and
associating a first set of data storage system resources with a first of said one or more tiers in accordance with a corresponding first definition for said first tier, said first set used when processing storage provisioning requests and I/O requests for data storage consumers associated with said first tier, and wherein, for each of said one or more tiers having a corresponding definition including a second set of one or more of said plurality of predefined types of clauses specifying expected criteria, periodically performing first processing for each consumer associated with said each tier, said, first processing including:
a) determining a relative priority of clauses in said second set; and
b) performing second processing for each of at least a portion of clauses in said second set, said second processing including:
b1) determining whether observed data associated with storage for said each consumer is in accordance with expected criteria of said each clause; and
b2) if said observed data is not in accordance with said expected criteria, determining one or more remediation actions.

6. The method of claim 5, wherein said determining one or more remediation actions further includes performing:
determining whether each of said remediation actions adversely impacts other clauses in the second set by violating expected criteria for said other clauses for said each consumer; and
selecting a best one of said remediation actions in accordance with selection criteria, said selection criteria including selecting a remediation action which is expected to cause said observed data for said each consumer to be in accordance with said expected criteria of said each clause, does not violate expected criteria of other clauses in said second set for said each consumer having a higher priority than said each clause, and has a minimum adverse impact on expected criteria of other clauses in said second set for said each consumer having a lower priority than said each clause.

7. The method of claim 2, wherein said at least one goal clause includes criteria specified using an absolute value or a term which represents one or more values.

8. The method of claim 7, wherein said criteria of said at least one goal clause includes a first term selected from a plurality of terms, each of said plurality of terms being associated with one or more numeric values.

9. The method of claim 6, wherein said second set of clauses includes a first clause specifying first criterion and a second clause specifying second criterion, and said remediation actions include a first option which violates the first criterion and does not violate the second criterion, and a second option which violates the second criterion and does not violate the first criterion.

10. The method of claim 9, wherein if said first clause has a higher priority than said second clause, said selecting one of said remediation actions selects said second option.

11. The method of claim 9, wherein if said first clause has a lower priority than said second clause, said selecting one of said remediation actions selects said first option.

12. The method of claim 6, wherein said second set includes a performance goal clause specifying an expected rate of I/O performance, a cost clause specifying a cost objective and a device clause specifying a physical device characteristic, said performance goal clause having a first priority, said cost clause having a second priority lower than said first priority, and said device clause having a third priority lower than said second priority, and wherein data for said each consumer is stored on a first device set of one or more devices, and said data storage system includes a second device set of one or more devices and a third device set of one or more devices, said second device set and said third device set having actual rates of I/O performance better than the expected rate of I/O performance, said second device set not violating said cost clause and violating said device clause, said third device set violating said cost clause and violating said device clause.

13. The method of claim 12, wherein remediation actions to increase the actual rate of I/O performance for said each consumer to meet the expected rate of I/O performance include: increasing an amount of cache available for use by said each consumer, migrating a portion of data for said each consumer from said first device set to said second device set, and migrating a portion of data for said each consumer from said first device set to said third device set, and wherein, if it is determined that a portion of data for said each consumer should be migrated rather than increasing an amount of cache, said selecting one of said remediation actions causes a migration of a portion of data for said each consumer front said first device set to said second device set in accordance with said second set of clauses and associated relative priority of clauses in said second set.

14. A method of configuring resources of a data storage system comprising:
providing a definition for each of one or more tiers, each of said one or more tiers corresponding to a different class of consumer of data storage system resources, each of said one or more tiers having a different corresponding definition including a set of one or more clauses and a priority of each clause in said set relative to other clauses in said set, each of said clauses in said set being one of a plurality of predefined types of clauses, said plurality of predefined types of clauses including at least one goal clause specifying an objective for said each tier and including at least one configuration clause specifying a data storage system configuration characteristic dependent on a data storage system resource used in connection with data storage for consumers of said each tier;
associating one or more data storage consumers with each of said one or more tiers; and
associating a first set of data storage system resources with a first of said one or more tiers in accordance with a corresponding first definition for said first tier, said first set used when processing storage provisioning requests and I/O requests for data storage consumers associated with said first tier, and wherein said first set of data storage system resources is selected in accordance with clauses of said first definition and a relative priority of clauses of said first definition, said first set having actual characteristics in accordance with a prioritized set of expected characteristics and expected objectives, said expected characteristics specified in configuration clauses of said first definition to attain said expected objectives specified in goal clauses of said first definition, said expected characteristics and said expected objectives being prioritized in said prioritized set in accordance with the relative priority of clauses for said first definition.

15. The method of claim 14, wherein processing is automatically performed to adjust data storage system resources in said first set if observed data is not in accordance with said prioritized set for said first definition.

16. The method of claim 15, wherein at least one goal clause for said first definition identifies an expected objective dependent on one or more dynamic characteristics of the data storage system.

17. A method of configuring resources of a data storage system comprising:
providing a definition for each of one or more tiers, each of said one or more tiers corresponding to a different class of consumer of data storage system resources, each of said one or more tiers having a different corresponding definition including a set of one or more clauses and a priority of each clause in said set relative to other clauses in said set, each of said clauses in said set being one of a plurality of predefined types of clauses, said plurality of predefined types of clauses including at least one goal clause specifying an objective for said each tier and including at least one configuration clause specifying a data storage system configuration characteristic dependent on a data storage system resource used in connection with data storage for consumers of said each tier;
associating one or more data storage consumers with each of said one or more tiers; and
associating a first set of data storage system resources with a first of said one or more tiers in accordance with a corresponding first definition for said first tier, said first set used when processing storage provisioning requests and I/O requests for data storage consumers associated with said first tier, and wherein, for said first tier having said first definition including a second set of one or more of said plurality of predefined types of clauses specifying expected criteria, periodically performing first processing for each consumer associated with said first tier, said first processing including:
determining whether said expected criteria for each clause in the second set is met; and
if said expected criteria for each clause in the second set is not met, adjusting said first set of data storage system resources in accordance with said second set and a relative priority of clauses in said second set.

18. The method of claim 6, wherein said selection criteria includes assessing, based on modeling implementation of a particular remediation action, whether implementation of the particular remediation action adversely impacts at least one of: other clauses for said each consumer, oilier consumers in said each tier, and another tier of said one or more tiers.

19. A computer readable medium comprising executable code stored thereon for configuring resources of a data storage system, the computer readable medium comprising executable code stored thereon for:
providing a definition for each of one or more tiers, each of said one or more tiers corresponding to a different class of consumer of data storage system resources, each of said one or more tiers having a different corresponding definition including a set of one or more clauses and a priority of each clause in said set relative to other clauses in said set, each of said clauses in said set being one of a plurality of predefined types of clauses specifying expected criteria, said plurality of predefined types of clauses including at least one goal clause specifying an objective for said each tier and including at least one configuration clause specifying a data storage system configuration characteristic dependent on a data storage system resource used in connection with data storage for consumers of said each tier;
associating one or more data storage consumers with each of said one or more tiers;
associating a first set of data storage system resources with a first of said one or more tiers in accordance with a corresponding first definition for said first tier, said first set used when processing storage provisioning requests and I/O requests for data storage consumers associated with said first tier, wherein said first set of data storage system resources is selected in accordance with first expected criteria that is included in clauses of the first definition and that is prioritized based on first relative priorities associated with the clauses of the first definition, said first set of data storage system resources having actual characteristics in accordance with the first relative priorities and the first expected criteria:
periodically determining whether the first expected criteria are met; and
automatically adjusting the first set of data storage system resources in accordance with the first expected criteria and the first relative priorities if the first expected criteria are not met.

20. The computer readable medium of claim 19, wherein said at least one goal clause includes at least one of a performance goal clause specifying an I/O performance goal, an availability goal clause specifying a level of availability, a protection clause specifying a recovery time objective, a protection clause specifying a recovery point objective, a cost clause specifying a data storage cost per unit of storage, and a power clause, and wherein said at least one configuration clause includes at least one of a utilization clause specifying a level of utilization of a data storage system component, a device type clause indicating a type of data storage device, a RAID type clause indicating a RAID level, and a replication clause indicating a data replication facility used to provide data replication.

* * * * *